US012514589B2

(12) United States Patent
Tafti

(10) Patent No.: US 12,514,589 B2
(45) Date of Patent: Jan. 6, 2026

(54) DEVICE FOR VASCULAR OCCLUSION AND METHODS OF USE THEREOF

(71) Applicant: TRANSLATIONAL AND FUNDAMENTAL TECHNOLOGIES INSTITUTE LLC, Encino, CA (US)

(72) Inventor: Bashir Akhavan Tafti, Encino, CA (US)

(73) Assignee: TRANSLATIONAL AND FUNDAMENTAL TECHNOLOGIES INSTITUTE LLC, Encino, CA (US)

( * ) Notice: Subject to any disclaimer, the term of this patent is extended or adjusted under 35 U.S.C. 154(b) by 0 days.

(21) Appl. No.: 18/662,610

(22) Filed: May 13, 2024

(65) Prior Publication Data

US 2024/0382208 A1 Nov. 21, 2024

Related U.S. Application Data

(60) Provisional application No. 63/507,681, filed on Jun. 12, 2023, provisional application No. 63/466,220, filed on May 12, 2023.

(51) Int. Cl.
A61B 17/12 (2006.01)
A61B 17/00 (2006.01)
A61B 90/00 (2016.01)

(52) U.S. Cl.
CPC .. *A61B 17/12172* (2013.01); *A61B 17/00234* (2013.01); *A61B 17/12031* (2013.01); *A61B 17/12177* (2013.01); *A61B 90/39* (2016.02); *A61B 2017/00238* (2013.01); *A61B 2017/00292* (2013.01); *A61B 2017/00367* (2013.01); *A61B 2017/00477* (2013.01); *A61B 2017/12054* (2013.01); *A61B 17/12109* (2013.01); *A61B 2090/3966* (2016.02); *A61B 2217/007* (2013.01)

(58) Field of Classification Search
CPC ........ A61B 17/12172; A61B 17/12031; A61B 17/12177; A61B 17/12109; A61B 2017/00238; A61B 2017/00292; A61B 2017/00367; A61B 2017/00477; A61B 2017/12054; A61F 2/0108; A61F 2/012; A61F 2/01
See application file for complete search history.

(56) References Cited

U.S. PATENT DOCUMENTS

| | | | |
|---|---|---|---|
| 5,658,308 | A | 8/1997 | Snyder |
| 5,702,413 | A | 12/1997 | Lafontaine |
| 5,766,191 | A | 6/1998 | Trerotola |
| 5,792,154 | A | 8/1998 | Doan et al. |
| 5,935,145 | A | 8/1999 | Villar et al. |
| 6,001,092 | A | 12/1999 | Mirigian et al. |
| 6,033,423 | A | 3/2000 | Ken et al. |
| 6,280,457 | B1 | 8/2001 | Wallace et al. |

(Continued)

OTHER PUBLICATIONS

International Search Report and Written Opinion for International Patent Application No. PCT/US2024/029119, mailed Sep. 17, 2024 (12 pages).

(Continued)

*Primary Examiner* — Darwin P Erezo
*Assistant Examiner* — Raihan R Khandker
(74) *Attorney, Agent, or Firm* — Clark & Elbing LLP

(57) ABSTRACT

The present disclosure features devices, systems, and kits for vascular occlusion and methods of use thereof.

29 Claims, 22 Drawing Sheets

(56) References Cited

U.S. PATENT DOCUMENTS

| | | | |
|---|---|---|---|
| 6,299,627 | B1 | 10/2001 | Eder et al. |
| 7,220,270 | B2 | 5/2007 | Sawhney et al. |
| 7,938,820 | B2 | 5/2011 | Webster et al. |
| 8,105,309 | B2 | 1/2012 | Kassab et al. |
| 8,123,777 | B2 | 2/2012 | Krolik et al. |
| 8,163,362 | B2 | 4/2012 | Russell |
| 8,535,700 | B2 | 9/2013 | Chinn et al. |
| 8,734,374 | B2 | 5/2014 | Aklog et al. |
| 8,784,442 | B2 | 7/2014 | Jones et al. |
| 9,060,802 | B2 | 6/2015 | Kugler et al. |
| 10,117,671 | B2 | 11/2018 | McGuckin, Jr. et al. |
| 10,188,409 | B2 | 1/2019 | Smalling |
| 10,194,928 | B2 | 2/2019 | Yu |
| 10,251,739 | B2 | 4/2019 | Janardhan et al. |
| 10,517,605 | B2 | 12/2019 | Venkatraman et al. |
| 10,641,640 | B2 | 5/2020 | Oh |
| 10,695,159 | B2 | 6/2020 | Hauser |
| 10,786,268 | B2 | 9/2020 | Ben-Ami |
| 11,013,523 | B2 | 5/2021 | Arad Hadar |
| 11,026,708 | B2 | 6/2021 | Marks et al. |
| 11,027,104 | B2 | 6/2021 | Kume et al. |
| 11,090,078 | B2 | 8/2021 | Walzman |
| 2001/0046518 | A1* | 11/2001 | Sawhney ............ A61L 24/0031 424/78.3 |
| 2004/0210249 | A1* | 10/2004 | Fogarty ............ A61B 17/12118 606/200 |
| 2006/0020285 | A1* | 1/2006 | Niermann ................ A61F 2/01 606/200 |
| 2006/0052823 | A1* | 3/2006 | Mirizzi ............ A61B 17/12195 606/214 |
| 2006/0116713 | A1 | 6/2006 | Sepetka et al. |
| 2008/0114391 | A1 | 5/2008 | Dieck et al. |
| 2008/0125798 | A1 | 5/2008 | Osborne et al. |
| 2010/0094320 | A1 | 4/2010 | Arat et al. |
| 2010/0204712 | A1 | 8/2010 | Mallaby |
| 2010/0324590 | A1* | 12/2010 | Johnson ............... A61B 17/221 606/200 |
| 2011/0152920 | A1 | 6/2011 | Eckhouse et al. |
| 2011/0213403 | A1 | 9/2011 | Aboytes |
| 2013/0345739 | A1 | 12/2013 | Brady et al. |
| 2014/0094901 | A1 | 4/2014 | Lorenzo et al. |
| 2014/0277006 | A1 | 9/2014 | Bonnette et al. |
| 2014/0309631 | A1 | 10/2014 | McLawhorn et al. |
| 2015/0359539 | A1* | 12/2015 | Hadley ............ A61B 17/12109 606/191 |
| 2016/0143653 | A1* | 5/2016 | Vale ........................ A61F 2/013 606/114 |
| 2016/0166257 | A1* | 6/2016 | Allen ............... A61B 17/12109 606/200 |
| 2017/0043066 | A1 | 2/2017 | Laub |
| 2017/0071614 | A1 | 3/2017 | Vale et al. |
| 2018/0271548 | A1* | 9/2018 | Ulm .................. A61M 25/0108 |
| 2019/0000492 | A1* | 1/2019 | Casey .............. A61B 17/22031 |
| 2019/0000500 | A1 | 1/2019 | Masubuchi et al. |
| 2019/0142435 | A1* | 5/2019 | DeMeritt ........... A61B 17/0057 606/191 |
| 2019/0231355 | A1 | 8/2019 | DeMeritt |
| 2019/0350590 | A1 | 11/2019 | Aboytes et al. |
| 2021/0138194 | A1 | 5/2021 | Garrison et al. |
| 2021/0228224 | A1 | 7/2021 | Razack |
| 2021/0236150 | A1 | 8/2021 | Arad Hadar |
| 2022/0192688 | A1 | 6/2022 | Olsen et al. |
| 2024/0398429 | A1 | 12/2024 | Tafti |

OTHER PUBLICATIONS

International Search Report and Written Opinion for International Patent Application No. PCT/US2024/032280, mailed Oct. 1, 2024 (13 pages).

* cited by examiner

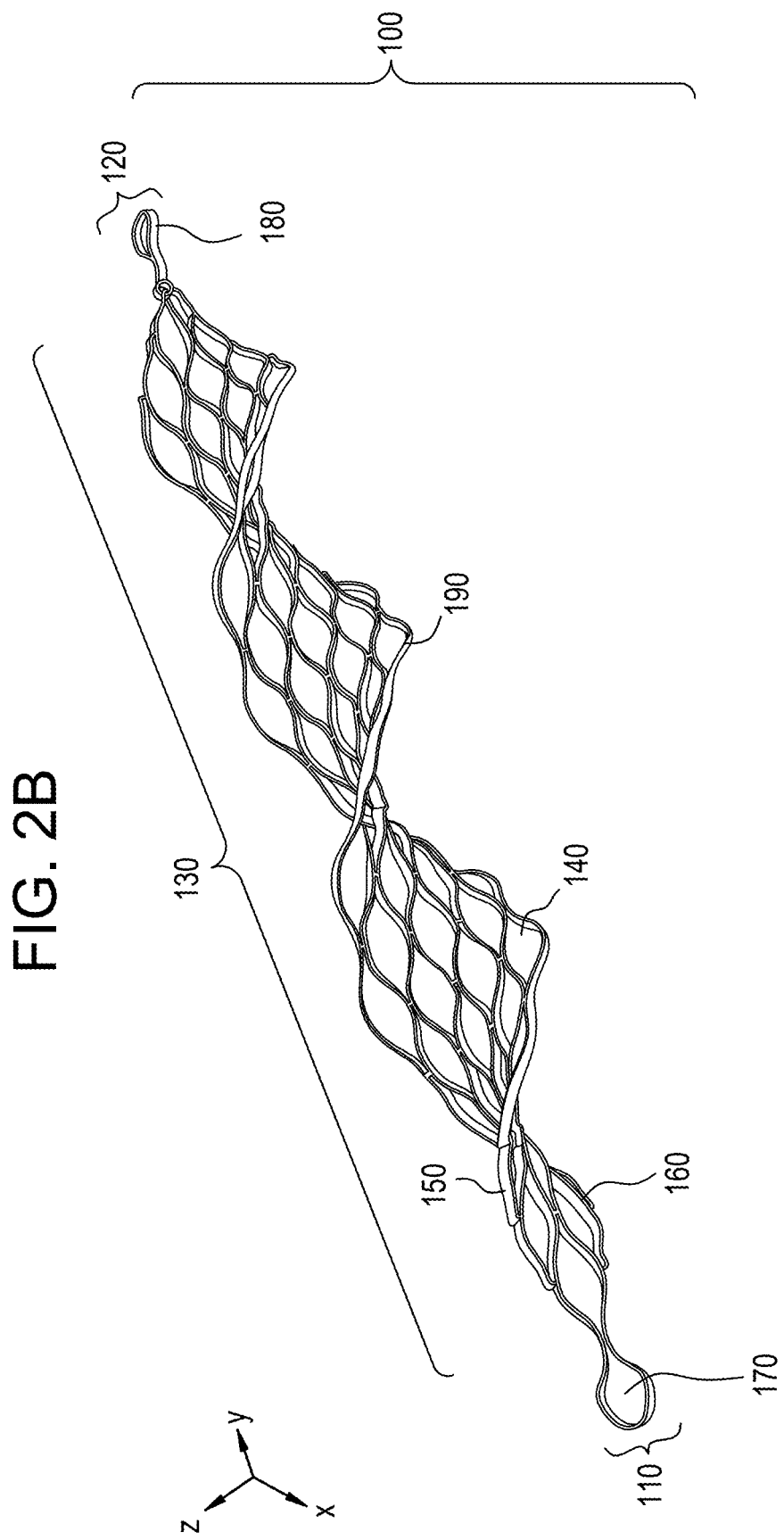

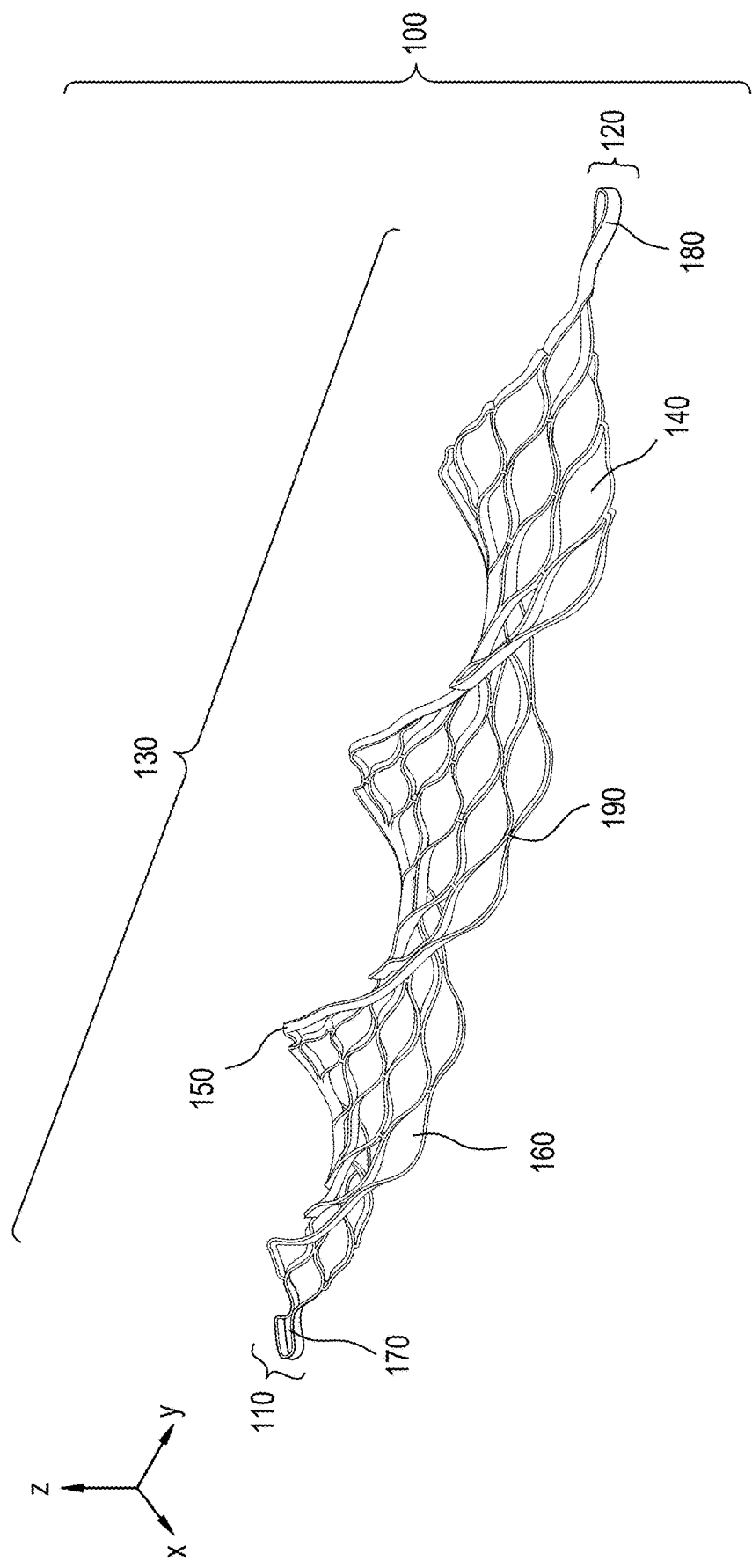

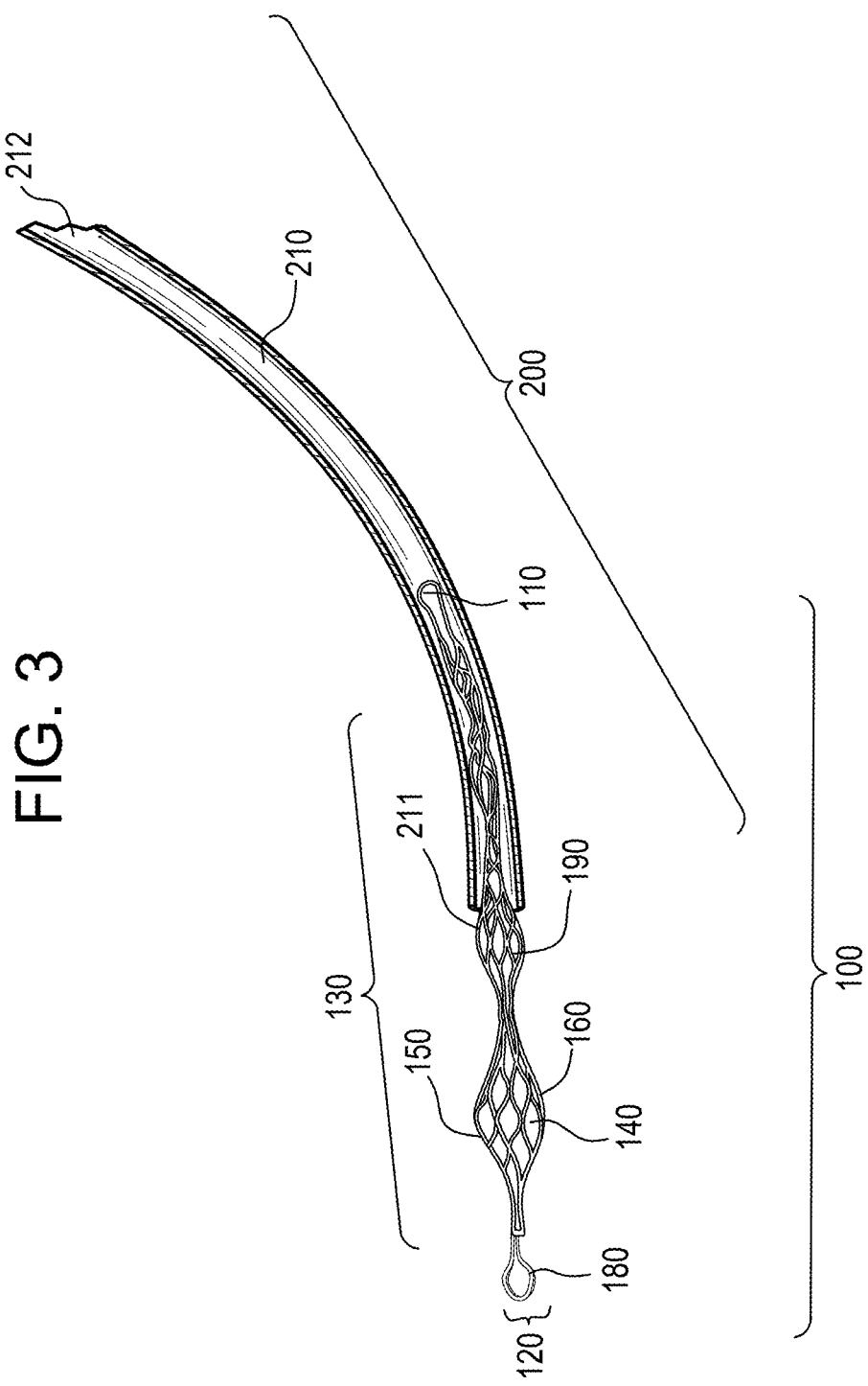

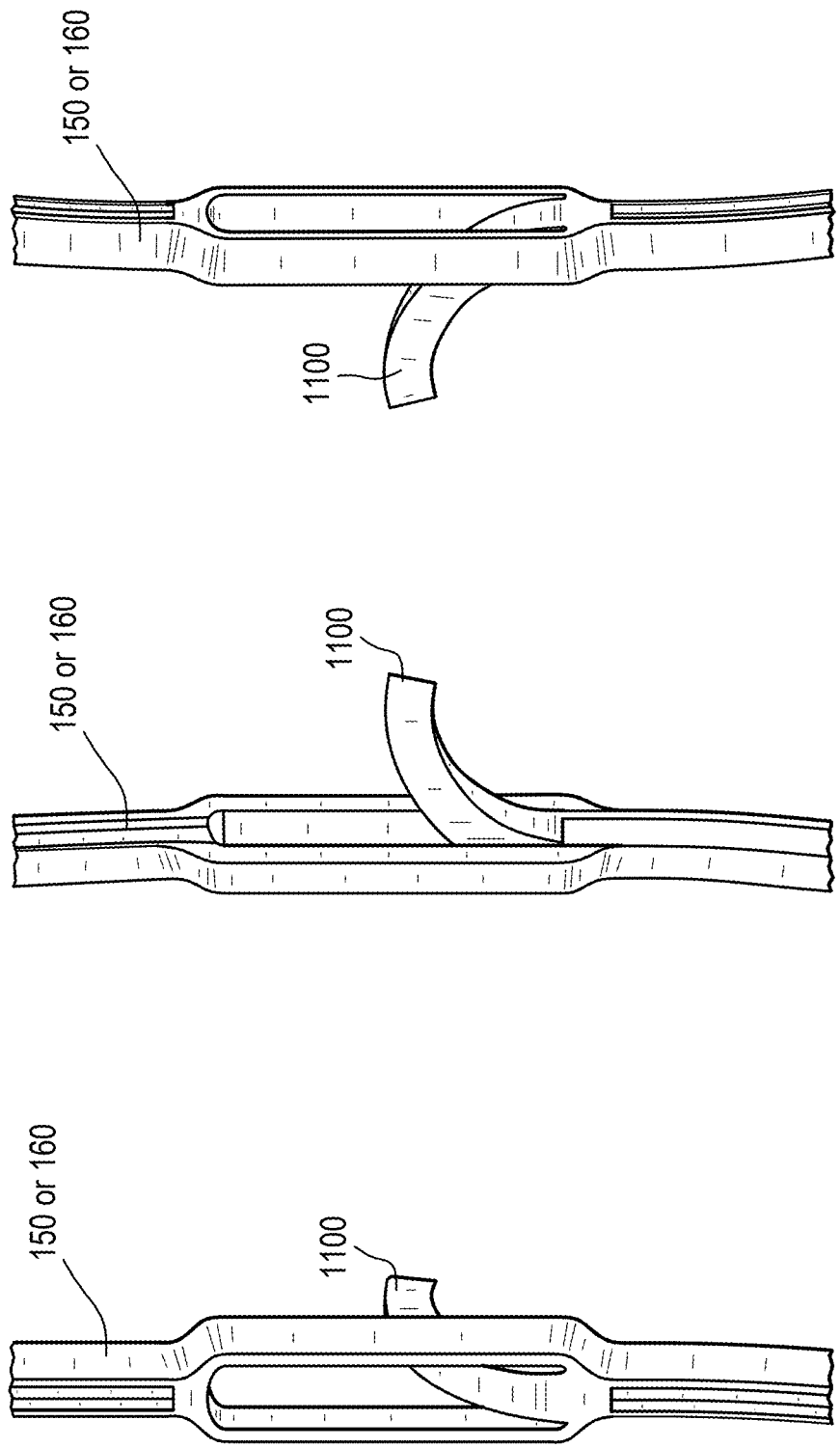

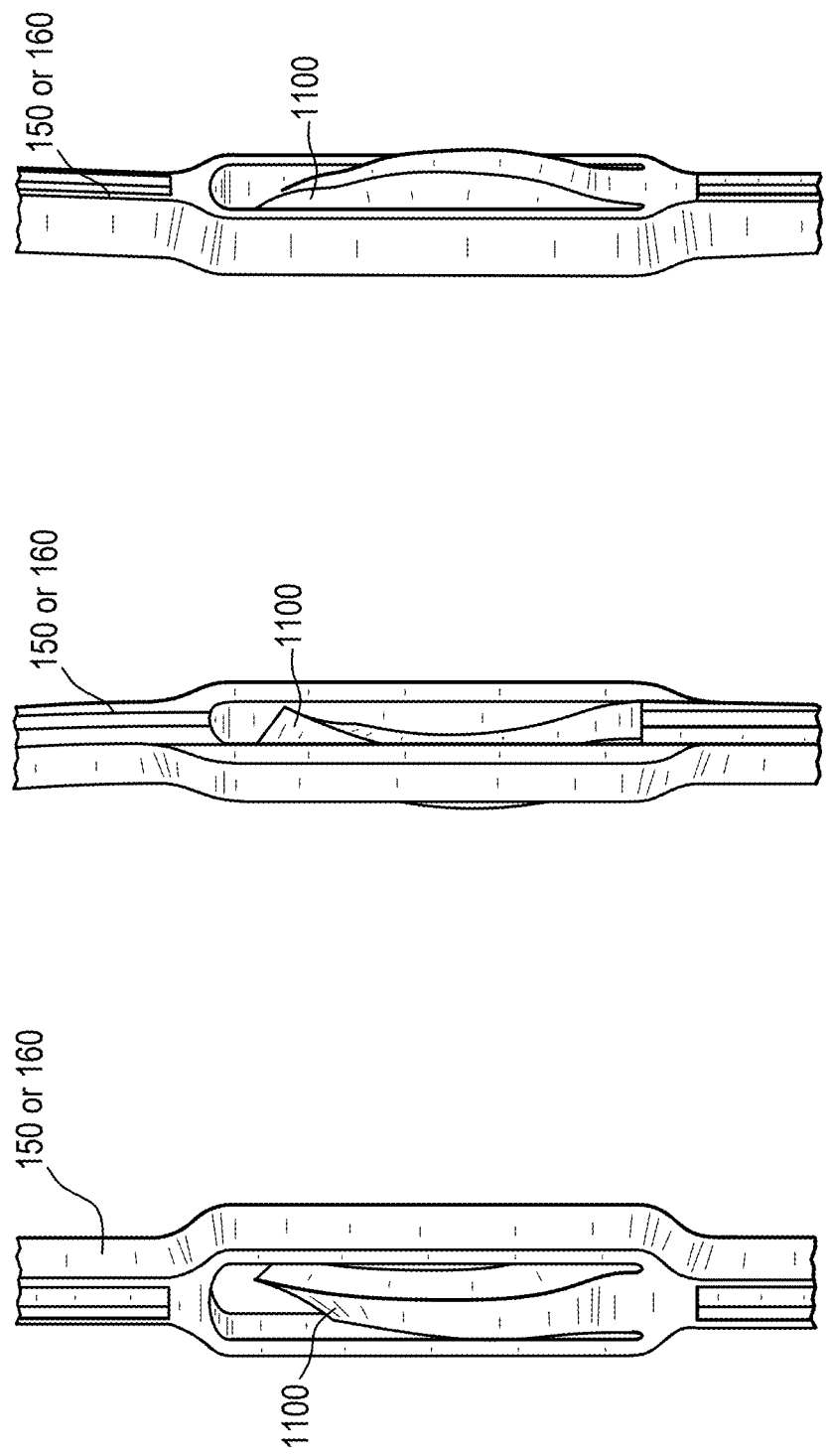

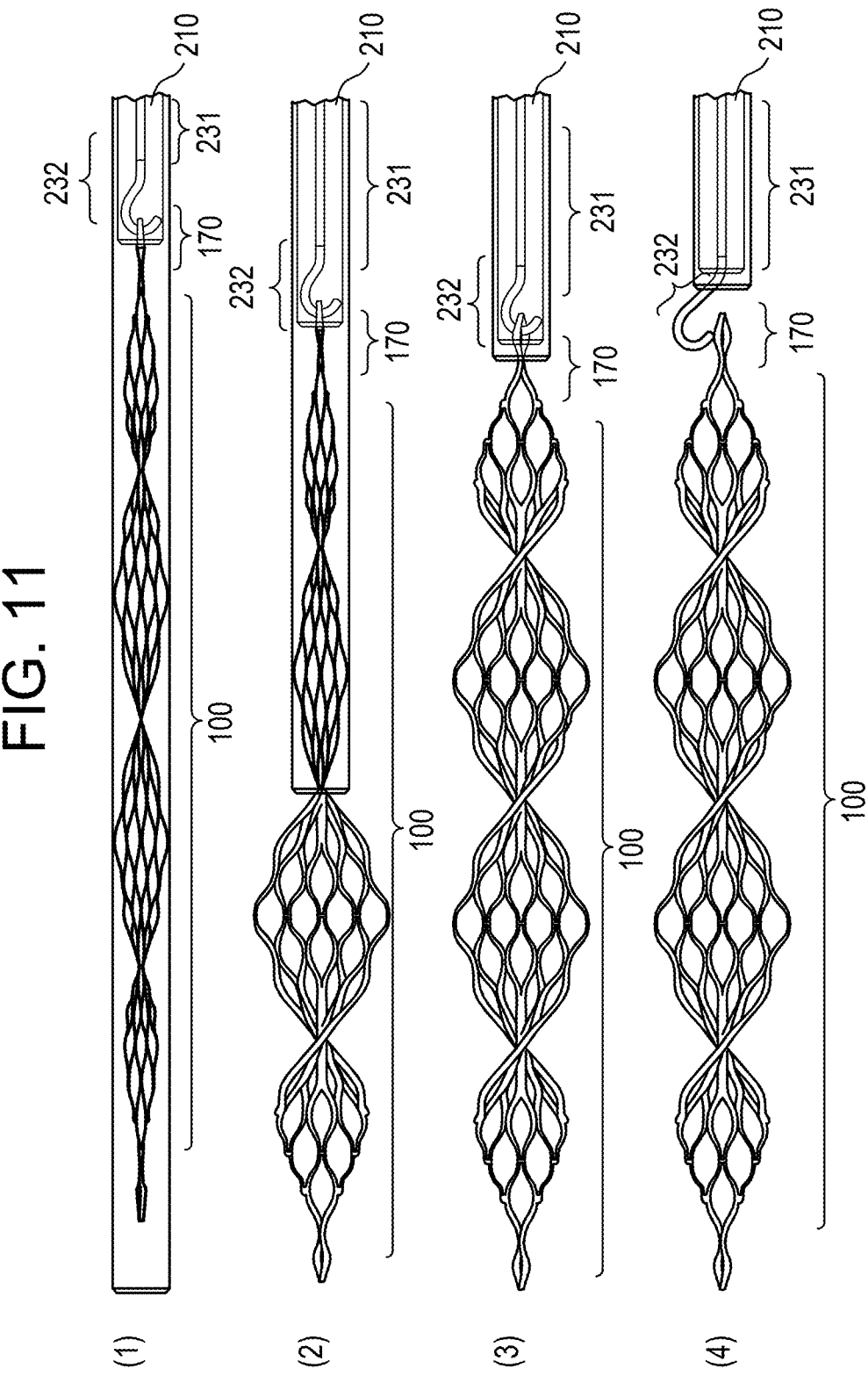

DEVICE FOR VASCULAR OCCLUSION AND METHODS OF USE THEREOF

BACKGROUND OF THE DISCLOSURE

Embolization procedures temporarily or permanently occlude blood flow to one or more designated blood vessels. Endovascular embolization is a minimally-invasive method for treatment of a wide variety of medical conditions including, but not limited to, traumatic and non-traumatic hemorrhage, preoperative devascularization of organs and tumors, hepatic growth stimulation before surgery, congenital or acquired vascular malformations, pelvic venous congestion syndrome, and varicocele.

Vascular coils and vascular plugs are the most commonly used devices for mechanical vascular embolization. In several clinical settings, vascular plugs can be advantageous over coils. For example, vascular plugs can have a lower risk of migration in high-flow vasculature or in short landing zones; occlusion of larger vessels can be achieved with a single plug rather than multiple coils; and the delivery mechanisms allow for repositioning and precise placement. In addition, because of their ability to achieve faster occlusion as compared to vascular coils, vascular plugs can reduce procedure time. Finally, vascular plugs are considered a more cost-effective intervention as vascular plugs can result in complete vascular occlusion in less time and using fewer devices.

Currently available vascular plugs have certain limitations. First, navigating such plugs through tortuous vasculature is more challenging due to their relatively bulkier structure. Second, multiple of these vascular plugs need to be used when embolization of longer vascular segments is desired (e.g., when treating pelvic congestion syndrome and varicocele), rendering them on par with vascular coils in terms of procedure time and cost. Third, these vascular plugs are not well suited for embolization across acute angles and are associated with increased embolization time and risk of recanalization in such settings. Fourth, these vascular plugs require 20-30% oversizing to ensure appropriate apposition to the vessel wall. However, oversizing often results in plug elongation and inadvertent closure of other vessels after deployment. Inadvertent closure of other vessels is a critical consideration when embolizing vessels with a short trunk length (e.g., the gastroduodenal artery). Fifth, most available vascular plugs cannot be deployed over a wire. Sixth, although these vascular plugs are amenable to repositioning before full deployment, they cannot be repositioned after placement and release.

Thus, there exists a need for improved vascular plugs that address these challenges.

SUMMARY OF DISCLOSURE

The present disclosure features devices for vascular occlusion and methods of use thereof.

In an aspect, the disclosure features a vascular occlusion device including a proximal end and a distal end defining a first axis and having a length therebetween. The vascular occlusion device includes a helical lattice along the first axis, wherein the helical lattice includes a width that extends along a second axis that is perpendicular to the first axis, and one or more connectors at the proximal end, distal end, or both. The helical lattice is a helical sheet that includes a network of lattice cells. The helical lattice is configured to convert between a compressed state (e.g., a deformed shape) and an uncompressed state (e.g., a non-deformed shape) about the second axis.

In some embodiments, the vascular occlusion device is sized to occlude a blood vessel (e.g., a vein, an artery, a graft, a stent, an arteriole, a capillary, a splenic artery, a gastroduodenal artery, and a fistula). In some embodiments, the helical lattice includes about 1 to about 25 turns (e.g., from about 1 to 10 turns, from about 1 to 5 turns, or about 3 turns). In some embodiments, each turn includes a pitch from about 1 mm to about 30 mm (e.g., about 1-20 mm, about 5-20 mm, or about 5-15 mm). In some embodiments, the lattice cells are compressible (e.g., deformable). In some embodiments, the lattice cells comprise a polygonal, square, rectangular, triangular, diamond, circular, elliptical, oval, oblong, lens, asteroid, deltoid, slit, or amorphous shape.

In some embodiments, the width of the vascular occlusion device is from about 1 mm to about 30 mm (e.g., about 1-20 mm, about 5-20 mm, or about 5-15 mm) when the vascular occlusion device is in the uncompressed state (e.g., a non-deformed shape or non-compacted shape). In some embodiments, the width of the vascular occlusion device is periodic along the length. In some embodiments, the width of the helical lattice is greater than the width of the vascular occlusion device at proximal end, the distal end, or both. In some embodiments, the helical lattice includes a thickness from about 0.01 mm to about 1 mm (e.g., a thickness from about 0.03 mm to about 0.8 mm, a thickness from about 0.05 mm to about 0.6 mm, a thickness from about 0.1 mm to about 0.4 mm, or a thickness from about 0.2 mm to about 0.3 mm). In some embodiments, the length of the vascular occlusion device is from about 10 mm to about 600 mm (e.g., from about 20 mm to about 500 mm, from about 30 mm to about 400 mm, from about 40 mm to about 300 mm, from about 50 mm to about 200 mm, from about 60 mm to about 100 mm, or about 80 mm).

In some embodiments, the helical lattice is self-expanding from the compressed state to the uncompressed state (e.g., the helical lattice is able to return to its pre-deformed or non-compacted shape once the compression force is removed). In some embodiments, the helical lattice is flexible. In some embodiments, the helical lattice includes two outer edges, wherein the lattice cells are disposed between the two outer edges. In some embodiments, the one or more connectors are configured to reversibly engage with a pusher (e.g., a pusher including a deployment hook). In some embodiments, the one or more connectors comprise one or more loops or fasteners. In some embodiments, the connector includes a lumen configured to accommodate a guidewire, such as a guidewire with a diameter from about 0.2 mm to about 1 mm.

In some embodiments, the vascular occlusion device includes a radiopaque marker. In some embodiments, the radiopaque marker is located on the distal end, the proximal end, the helical lattice, or combinations thereof.

In some embodiments, the helical lattice is made of or includes a shape memory material. In some embodiments, the shape memory material includes nitinol. In some embodiments, The vascular occlusion device further includes a coating. In some embodiments, the coating includes a thrombogenic agent. In some embodiments, the coating includes thrombin. In some embodiments, the coating includes a hydrogel. In some embodiments, the hydrogel includes a polysaccharide, a mucopolysaccharide, a carboxy alkyl cellulose, a synthetic polymer, or a protein.

In some embodiments, the vascular occlusion device further includes a plurality of filaments attached to the helical lattice, wherein at least a portion of the filaments extend radially from the helical lattice. In some embodiments, the filaments include a thrombogenic agent. In some embodiments, the filaments comprise a synthetic polymer. In some embodiments, the synthetic polymer includes polyester.

In a second aspect, the disclosure features a delivery system that includes the vascular occlusion device of the first aspect, a catheter with a proximal and a distal end with a length therebetween, a pusher comprising a proximal end and a distal end, wherein the distal end is configured to reversibly attach to the proximal end of the connector; and a cartridge. In some embodiments, the reversible attachment between the pusher and the proximal connector of the vascular occlusion device is rotational engagement. In some embodiments, the pusher comprises a deployment shaft with a proximal end and a distal end, and a deployment hook at the distal end, wherein the deployment hook engages with the proximal connector of the vascular occlusion device. In some embodiments, the deployment shaft is a wire or a rod, wherein, optionally, the wire is configured to slidably translate the vascular occlusion device through the catheter upon the application of force, thereby moving the vascular occlusion device through the catheter and to a target site in a blood vessel for vascular occlusion.

In some embodiments, the cartridge includes a proximal opening and a distal opening, with a lumen at either the proximal opening, the distal opening, or both, and a lumen spanning the length of the cartridge from the proximal opening to the distal opening. In some embodiments, the lumen of the cartridge is sized to accept the vascular occlusion device, which can be inserted into, or compressed (e.g., deformed or compacted) within, the cartridge. In some embodiments, the catheter includes a proximal end and a distal end, wherein, optionally, the proximal end of the catheter is configured to receive the distal end of the cartridge. In some embodiments, the proximal end of the catheter is configured to reversibly attach to the cartridge. In some embodiments, the reversible attachment is made by a pressure fit. In some embodiments, the proximal end of the catheter is attached to the distal opening of the cartridge. In some embodiments, attachment of the cartridge to the catheter produces fluid communication therebetween, whereby the vascular occlusion device, which is present within the cartridge, can be slidably translated from the cartridge into the catheter by way of the attachment. In some embodiments, the proximal opening, the distal opening, and/or the lumen of the cartridge comprise a lumen configured to accept a guidewire, wherein, optionally, the guidewire has a diameter from about 0.2 mm to about 1 mm. In some embodiments, the guidewire is configured to direct the vascular occlusion device through the catheter and to a target site in a blood vessel for vascular occlusion.

In some embodiments, the delivery system further includes a deployment device, wherein the deployment device is configured to interface with the proximal end of the catheter and the proximal end of the pusher. In some embodiments, the pusher is advanced along the length of the catheter by applying force to the deployment device.

In some embodiments, the delivery system includes an actuator configured such that operation of the actuator either retracts the catheter into the deployment device, or extends the catheter from the body of the deployment device. In some embodiments, the actuator is a rotary actuator.

In some embodiments, the deployment device further comprises an inlet port in fluid communication with proximal end of the catheter. In some embodiments, the inlet port is configured to interface with a fluid source, such that the fluid source may flow through the inlet port into the lumen of the catheter, allowing the delivery of a fluid contained in the fluid source to the vasculature of a subject.

In some embodiments, the deployment device further comprises a deployment release configured such that operation of the deployment release manipulates the position of the deployment hook. In some embodiments, operation of the deployment release may raise the deployment hook to disengage the deployment hook from the proximal connector or lower the deployment hook to engage the deployment hook and the proximal connector. In some embodiments, the deployment release is mechanically coupled or electronically coupled to the deployment hook. In some embodiments, operation of the deployment release includes depressing the deployment release, rotating the deployment release, or sliding the deployment release.

In a third aspect, the disclosure features a method of occluding a blood vessel (e.g., a vein, an artery, a graft, a stent, an arteriole, a capillary, a splenic artery, a gastroduodenal artery, and a fistula) by a) inserting the vascular occlusion device of the first and/or second aspect in the compressed state (e.g., deformed or compacted shape) into the blood vessel, and b) deploying the vascular occlusion device at a target site in the blood vessel, whereby the vascular occlusion device converts to the uncompressed state (e.g., a non-deformed or non-compacted shape that the device had prior to the application of compression force), thereby occluding blood flow in the blood vessel.

In some embodiments, the method further includes advancing the vascular occlusion device through the blood vessel after insertion step a) (e.g., by moving the vascular occlusion device along a catheter present in the blood vessel, e.g., by using a pusher). In some embodiments, traversal of the vascular occlusion device through the blood vessel is achieved by using one or more components of the delivery system of the second aspect (e.g., one or more of a catheter, a guidewire, and a pusher).

In some embodiments, the delivery system includes a catheter, a guidewire, and/or a pusher, each of which are used to translate the vascular occlusion device through the blood vessel and to the target site of vascular occlusion. In some embodiments, the vascular occlusion device is present within the cartridge of the delivery system prior to step a). In some embodiments, the vascular occlusion device is housed within the lumen of the cartridge. In some embodiments, the method further includes attaching the cartridge to a proximal end of a catheter prior to step a).

In some embodiments, inserting the vascular occlusion device in step a) further includes transferring the vascular occlusion device from the cartridge into the catheter by use of the pusher. In some embodiments, the vascular occlusion device is reversibly attached to the pusher. In some embodiments, the reversible attachment is by rotational engagement (e.g., a hook and loop engagement). In some embodiments, the pusher is detached from the vascular occlusion device after the vascular occlusion device is deployed in the blood vessel and converts to the uncompressed state (e.g., non-deformed or non-compacted shape).

In some embodiments, the method further includes advancing the vascular occlusion device through the blood vessel while the vascular occlusion device is inside the catheter. In some embodiments, advancing the vascular occlusion device in the blood vessel of the subject includes pushing the vascular occlusion device through the blood vessel (e.g., within a catheter that has been inserted into the blood vessel), e.g., by using the pusher. In some embodiments, the vascular occlusion device may be reversibly engaged with the pusher, e.g., through the proximal connector of the vascular occlusion device and the deployment hook of the pusher.

After the vascular occlusion device has been advanced to the desired site in the blood vessel inside the catheter, the pusher may be disengaged from the vascular occlusion device, and the catheter may be retracted, allowing the vascular occlusion device to convert to the uncompressed state. In some embodiments, disengaging the pusher from the vascular occlusion device includes disengaging the deployment hook from the proximal connector after the vascular occlusion device converts to the uncompressed state.

After deployment, the vascular occlusion device may be reengaged with the pusher by reengaging the deployment hook and the proximal connector after. The catheter may then be extended along the length of the vascular occlusion device, at least partially converting the vascular occlusion device to the compressed state. The vascular occlusion device may then be repositioned and/or redeployed in the vasculature of the subject. In some embodiments, repositioning includes extending the catheter fully along the length of the vascular occlusion device, converting the entirety of the vascular occlusion device to the compressed state and withdrawing the vascular occlusion device from the body of the subject. In some embodiments, the catheter interfaces with an actuator, wherein operation of the actuator retracts or extends the catheter. In some embodiments, the actuator is a rotary actuator.

The deployment hook may be mechanically or electronically coupled to a deployment release. Operating the deployment release raises or lowers the deployment hook, thereby the engaging and/or disengaging the deployment hook and the proximal connector. Both the deployment hook and the deployment release may be located on a deployment device. In an embodiment, the deployment device is a hand-held device.

In some embodiments, advancing the vascular occlusion device in the blood vessel of the subject includes advancing the vascular occlusion device over the guidewire, which is positioned to direct the vascular occlusion device to the target site of the blood vessel.

In some embodiments, the method includes administering a therapeutic agent via the catheter. In some embodiments, the therapeutic agent is a thrombogenic agent or an anti-tumor agent.

In a fourth aspect, this disclosure features a kit that includes the vascular occlusion device of the first aspect or the delivery system of the second aspect and one or more additional components. In some embodiments, the one or more additional components comprise one or more cartridges, catheters, guidewires, deployment devices, and/or pushers (e.g., a rod or wire).

Other features and advantages of the disclosure will be apparent from the following description of the preferred embodiments thereof, and from the claims.

DEFINITIONS

To facilitate an understanding of this disclosure, a number of terms are defined below. Terms defined herein have meanings as commonly understood by a person of ordinary skill in the areas relevant to the disclosure. Terms such as "a," "an," and "the" are not intended to refer to only a singular entity (unless context reveals otherwise), but include the general class of which a specific example can be used for illustration.

As used herein, the term "about" refers to a value that is within 10% above or below the value being described.

By "treating" or "treatment" is meant the medical management of a subject with the intent that an amelioration, repair, or prevention of an injury or disease, pathological condition, or disorder will result. Exemplary injuries, diseases, pathological conditions, or disorders that can be treated with the compositions and methods described herein include: hemorrhages, preoperative devascularization of organs and tumors, ruptured aortic aneurysms, arteriovenous malformations, neurovascular abnormalities, arteriovenous fistulas, intracranial aneurysms, amelioration of vascular bleeding incurred during treatment of any disease or disease, hepatic growth stimulation, pelvic venouse congestion syndrome, congenital or aquired vascular malformations, varicocele, and restriction of blood flow in a subject undergoing a surgical or imaging procedure (e.g., angiography). Treatment may include a reduction in blood flow in the subject to, e.g., less than about 60 mL/s, less than about 50 mL/s, less than about 40 mL/s, less than about 30 mL/s, less than about 20 mL/s, less than about 10 mL/s, less than about 5 mL/s less than about 4 mL/s, less than about 3 mL/s, less than about 2 mL/s, less than about 1 mL/s, about 0 mL/s, etc. "Treating" and "treatment" include active treatment, that is, treatment directed specifically toward improvement of the injury or disease, pathological condition, or disorder, and also includes causal treatment, that is, treatment directed toward removal of the cause of the injury or disease, pathological condition, or disorder. In addition, "treating" and "treatment" also include palliative treatment, that is, treatment designed for the relief of symptoms rather than the curing of the injury or disease, pathological condition, or disorder; preventive treatment, that is, treatment directed to prevention of the injury or disease, pathological condition, or disorder; and supportive treatment, that is, treatment employed to supplement another specific therapy directed toward the improvement of the injury or disease, pathological condition, or disorder.

As used herein, any values provided in a range of values include both the upper and lower bounds, and any values contained within the upper and lower bounds.

BRIEF DESCRIPTION OF THE DRAWINGS

The following detailed description of the embodiments of the disclosure may be better understood when read in conjunction with the appended drawings. It should be understood, however, that the disclosure is not limited to the precise arrangement and instrumentalities of the embodiments shown in the drawings.

FIGS. 2A-2F are images showing vascular occlusion device 100 including proximal end 110, distal end 120, and helical lattice 130 including lattice cells 140 therebetween, as well as a connector at proximal end 110 and distal end 120 (proximal connector 170 and distal connector 180, respectfully). Vascular occlusion device 100 may include coating 190. Each of FIGS. 2A-2F includes a common axis system highlighting the relative orientation of vascular occlusion device 100 in each view. FIG. 2A shows a side-on view of vascular occlusion device 100 (a view along the first axis of the device), highlighting proximal end 110 and distal end 120 of vascular occlusion device 100. FIGS. 2B-2F show rotation of vascular occlusion device 100 about the z-axis assigned in FIG. 2A.

FIG. 3 is an image of vascular occlusion device 100 partially inserted into delivery system 200, which includes catheter 210 with proximal end 211 and distal end 212. Proximal end 110 of vascular occlusion device 100, proximal connector 170, and a portion of helical lattice 130 are compressed inside catheter 210. Distal end 120, distal connector 180, and a portion of helical lattice 130 are uncompressed outside of catheter 210.

FIGS. 4A and 4B are images showing a barb in three different orientations that can be incorporated into a vascular occlusion device. FIG. 4A shows an embodiment of a barb in an uncompressed state. FIG. 4B shows an embodiment of a barb in a compressed state. Barbs may be included along helical lattice 130 (e.g., at first outer edge 150 or second outer edge 160).

FIGS. 9E-9F show perspective views of cartridge 220, in which cartridge 220 may be asymmetric and require deployment through different vascular access points, such as the femoral artery (FIG. 9E) or the jugular vein (FIG. 9F). Cartridge 220 can be designed with markings to convey the directionality of the device, e.g., with regard to blood flow and/or deployment of vascular occlusion device 100.

FIG. 10A shows vascular occlusion device 100 in the compressed state within catheter 210. Proximal connector 170 at proximal end 110 interfaces with pusher 230, including deployment shaft 231 and deployment hook 232. FIG. 10B shows a close-up view of the distal end of vascular occlusion device 100 within catheter 210. FIG. 10C shows a close-up view of the interface between pusher 230 and proximal connector 170.

FIG. 11 shows an exemplary method of deploying vascular occlusion device 100.

FIG. 12A-12B show a top view of deployment device 240. FIG. 12C shows a side view of deployment device 240. FIG. 12B shows an arrow indicating a direction of rotation of rotary actuator 242. FIG. 12C further demonstrates the operation of deployment release 243. FIG. 12D shows deployment device 240, including inlet port 241, rotary actuator 242, and deployment release 243 interfacing with catheter 210. Vascular occlusion device 100 is shown restrained at the distal end of catheter 210.

DETAILED DESCRIPTION

The disclosure features devices, systems, methods, and kits for vascular occlusion. Particularly, the disclosure features a compressible (e.g., deformable or compactible) vascular occlusion device including a helical lattice.

Figure 1:
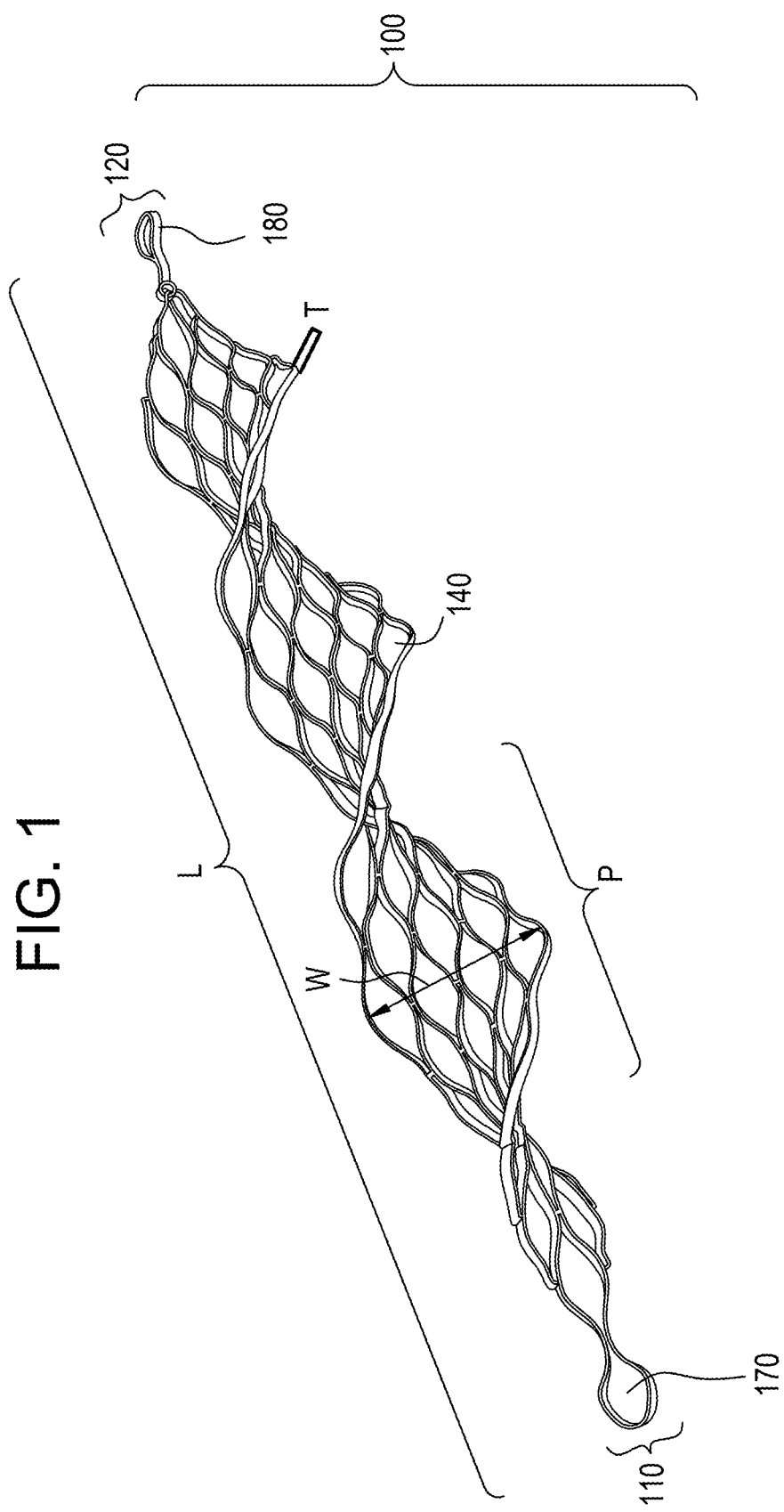
FIG. 1 is an image of vascular occlusion device 100 labeled to define the length (L), width (W), and thickness (T) of the vascular occlusion device, as well as the pitch (P) of a turn of the helical lattice.

Vascular occlusion device 100 can include a proximal portion, a distal portion, and a middle portion therebetween; in which the proximal portion, distal portion, and middle portions are disposed between proximal end 110 and distal end 120. The vascular occlusion device includes a width defined along a second axis perpendicular to the first axis. Vascular occlusion device 100 is defined by a length (L) and width (W) (FIG. 1). The length of vascular occlusion device 100 is the distance along a first axis, defined as the distance between proximal end 110 and distal end 120. The length of vascular occlusion device 100 may be from about 10 mm to about 600 mm (e.g., a length of from about 20 mm to about 500 mm, from about 30 mm to about 400 mm, from about 40 mm to about 300 mm, from about 50 mm to about 200 mm, from about 60 mm to about 100 mm, or about 80 mm). The width of the vascular occlusion device is the distance between two points on the vascular occlusion device along a second axis perpendicular to the first axis. The width or thickness of the device may be constant along the length of the device or it may vary. The width of vascular occlusion device 100 may be from about 1 mm to about 30 mm (e.g., about 1-20 mm, about 5-20 mm, or about 5-15 mm wide when in an uncompressed state (e.g., a non-deformed or non-compacted shape). The width of vascular occlusion device 100 may be periodic along the length. The proximal portion and the distal portion of vascular occlusion device 100 may be of the same width, or of different widths. In embodiments where the proximal portion and the distal portion are of different lengths, vascular occlusion device 100 may be referred to as "asymmetric." The middle portion of vascular occlusion device 100 may include a width that is greater than a width of the proximal portion and/or the distal portion.

Figure 2A:
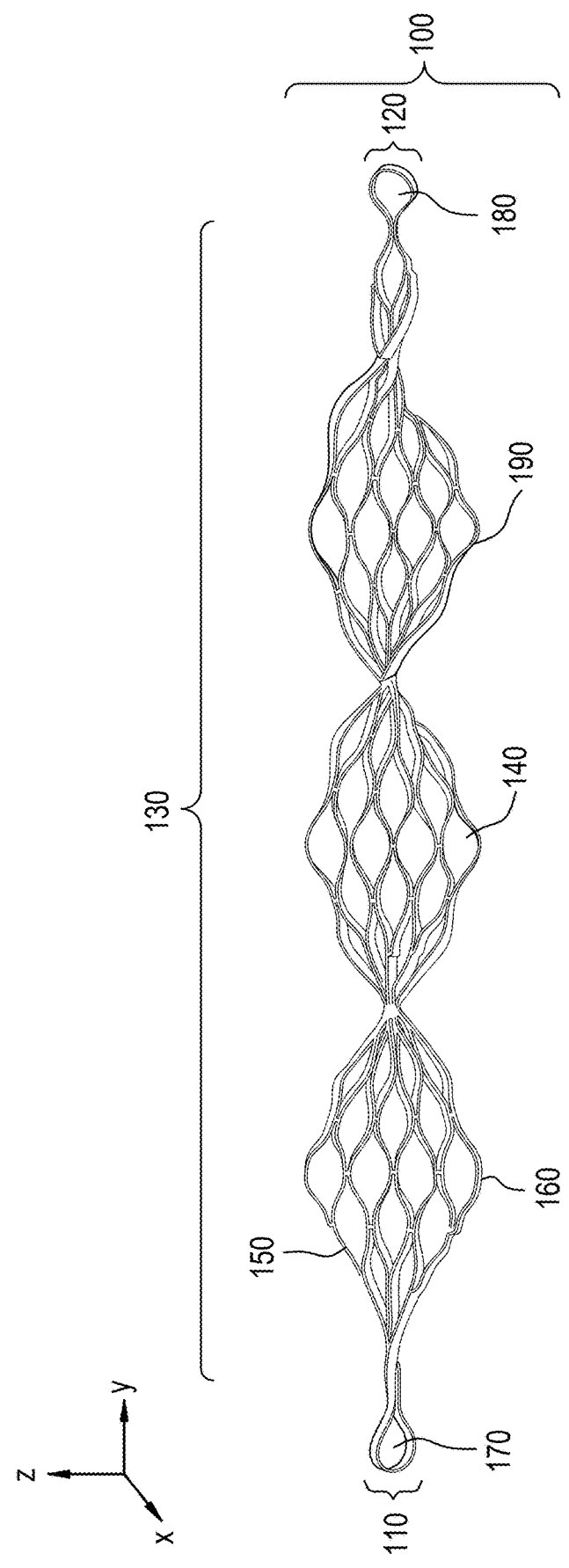
Figure 2C:
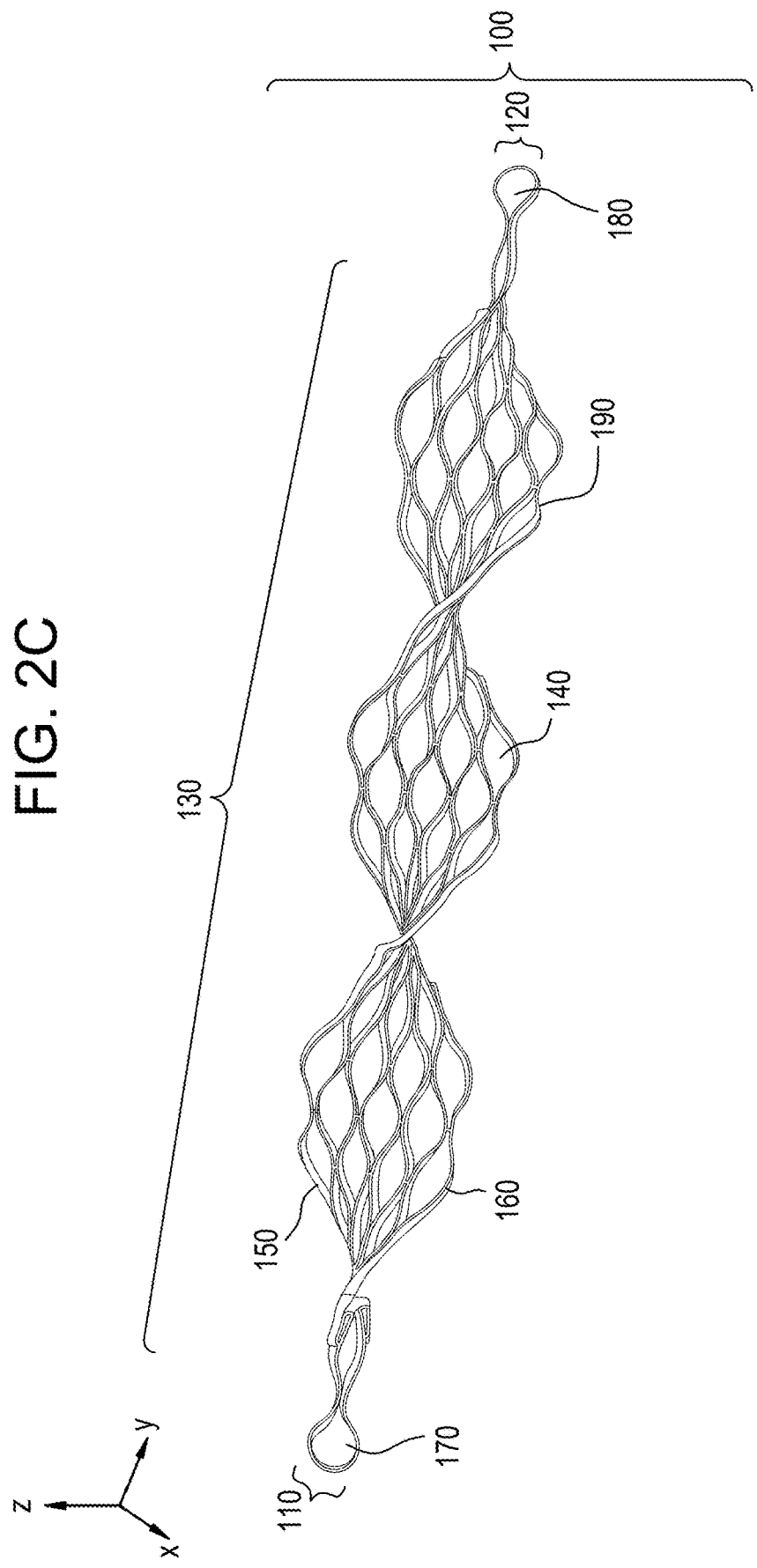
Figure 2E:
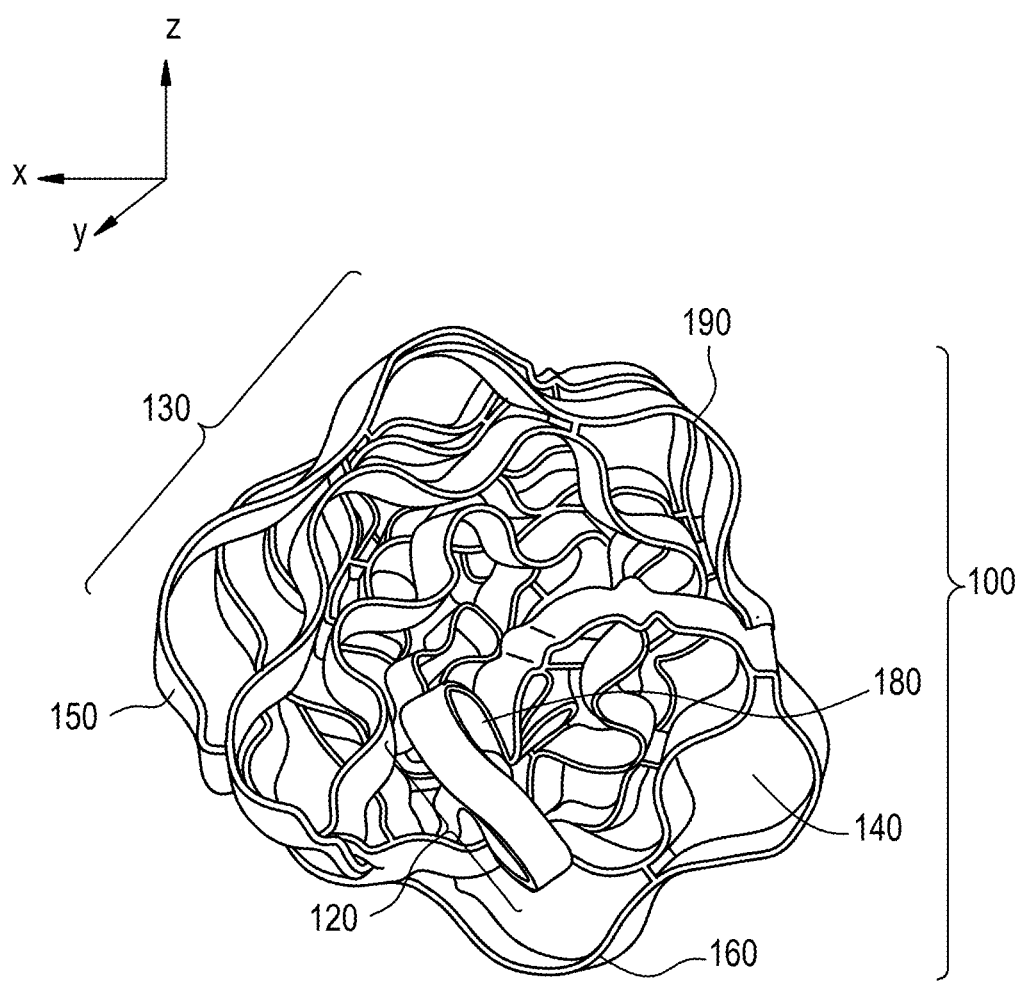
Figure 2F:
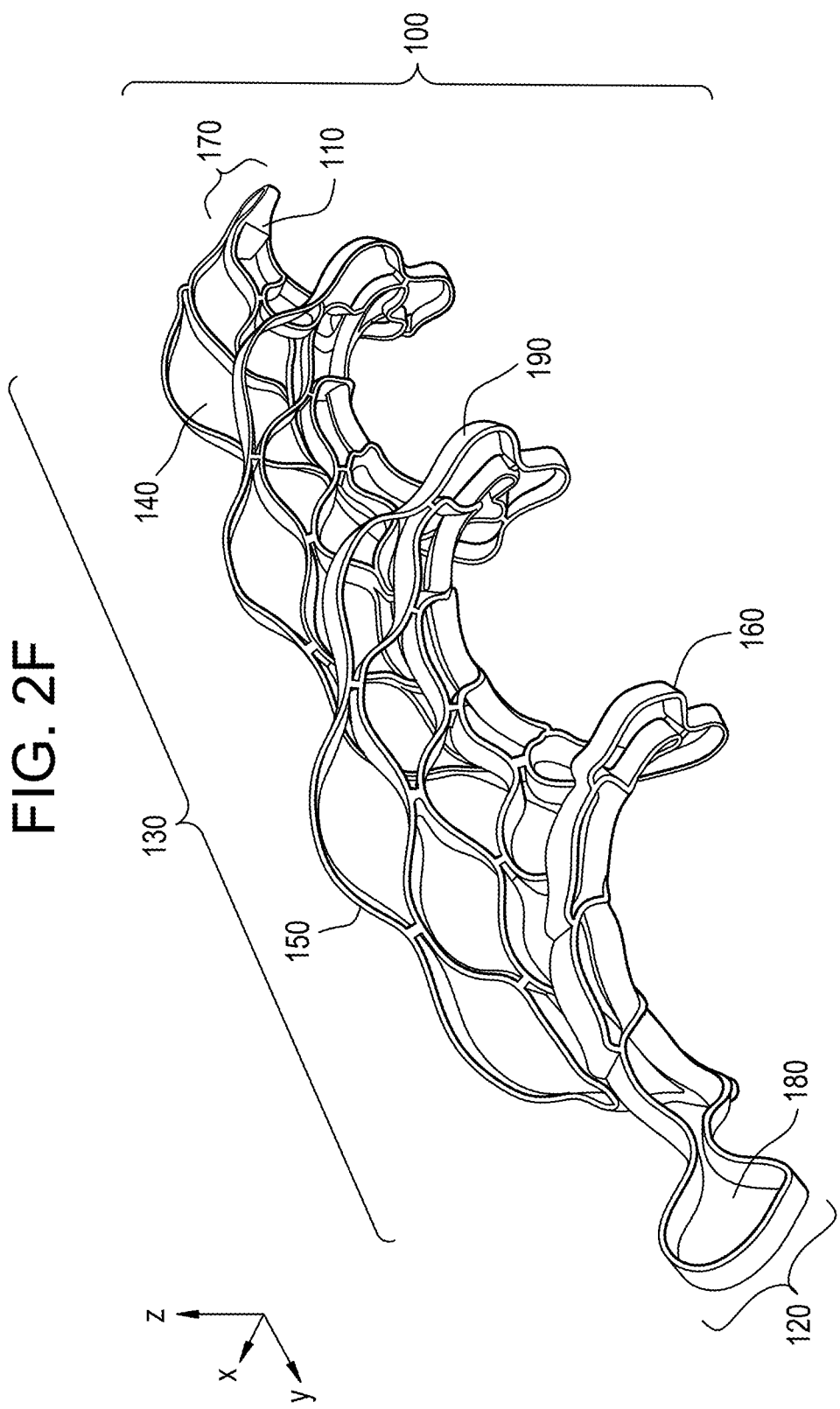

FIG. 2A shows a side view of vascular occlusion device 100 (i.e., a view along the second axis). FIG. 2B-2F show different orientations of vascular occlusion device 100 after rotation about an axis. Vascular occlusion device 100 includes a proximal portion, a distal portion, and a middle portion, all of which are disposed between proximal end 110 and distal end 120. The middle portion of the device comprises helical lattice 130, which is made of a network of lattice cells 140 therebetween. Helical lattice 130 may include first outer edge 150 and second outer edge 160, and disposed therebetween is the network of lattice cells 40. Proximal end 110 may include proximal connector 170, and distal end 120 may include distal connector 180. Either proximal connector 170 or distal connector 180 may interface with an external component (e.g., a guidewire or pusher, e.g., pusher 230), to facilitate the movement of vascular occlusion device 100 through the vasculature of the subject.

The proximal portion of vascular occlusion device 100 includes proximal end 110 and may further include proximal connector 170. The middle portion of vascular occlusion device 100, which includes helical lattice 130 may have a length from about 10 mm to about 600 mm and a width from about 1 mm to about 30 mm. The width of the middle portion may be periodic along its length. The distal portion of vascular occlusion device 100 includes distal end 120 and may further include distal connector 180. The middle portion can include a width greater than the width of the proximal portion and/or the distal portion.

All or a portion of vascular occlusion device 100, such as a portion that includes helical lattice 130, can be made using a shape memory material. The shape memory material may be or may include nitinol or stainless steel. Vascular occlusion device 100 may include one or more bioabsorbable materials, e.g., collagen, PLGA, and PLLA. Vascular occlusion device 100 can be made using more than one material. Proximal end 110 and distal end 120 may independently be made out of a material with a Young's Modulus of at least about 10 GPa (e.g., a Young's Modulus within the range of about 10 to about 50 GPa, such as a Young's Modulus of about 28 GPa). Any portion of vascular occlusion device 100 may be reinforced with a reinforcement material. The reinforcement material may be a wire, a braid, or a coil that passes through or is present within a lumen included at proximal end 110, distal end 120, and/or helical lattice 130. The reinforcement material may be a continuous layer on the surface of vascular occlusion device 100. Proximal end 110, distal end 120, and helical lattice 130 may independently be made out of or include a flexible material (e.g., a silicone rubber). For example, proximal end 110, distal end 120, and helical lattice 130 may be coated with the flexible material (e.g., a silicone rubber).

Helical lattice 130 includes one or more turns along the first axis of vascular occlusion device 100. Each turn is defined by a pitch (P). The pitch of the helical lattice may be from 1 mm to 200 mm (e.g., about 1-100 mm, about 1-30 mm, about 1-20 mm, about 5-20 mm, or about 5-15 mm). Helical lattice 130 may have about 1 to about 25 turns (e.g., from about 1 to 10 turns, from about 1 to 5 turns, or about 3 turns). The pitch of each turn may be the same or different. Helical lattice 130 further includes several lattice cells 140, each of which is defined by a shape and an area. The shape and/or area of all lattice cells 140 of helical lattice 130 may be identical. The shape and/or area of one or more lattice cells 140 may be different from one or more other lattice cells 140 of helical lattice 130. Helical lattice 130 may include more than one, e.g., more than two, more than three, more than four, more than five, more than six, more than seven, more than eight, more than nine, more than ten, etc., different shapes and/or areas of lattice cells 140.

Vascular occlusion device 100 may include one or more lumens, e.g., at or through proximal end 110, at or through proximal connector 170, at or through distal end 120, at or through distal connector 180, and/or at or through helical lattice 130. A guidewire may be run through one or more of these lumens, thereby slidably attaching vascular occlusion device 100 to the guidewire. The guidewire may be included as part of delivery system 200.

A person skilled in the art may choose a vascular occlusion device of appropriate length, width, thickness, number of turns, pitch of the one or more turns, shape or shapes of the one or more lattice cells, and/or area or areas of the one or more lattice cells for reduction of blood flow. A person of skill in the art may choose the dimensions of a vascular occlusion device based on, e.g., the size of the vessel to be occluded (see Table 1) and/or the desired amount of blood flow through and around the vessel after occlusion.

Vascular occlusion device 100 is sized to fit inside a blood vessel. The diameter of vascular occlusion device 100 and/or the diameter of helical lattice 130 may be selected so as to be slightly less than, approximately equal to, or slightly greater than the overall diameter of a blood vessel to be occluded using vascular occlusion device 100 (e.g., the width may be e.g., from about 1% to about 10% less than the width of the blood vessel). For example, the width of vascular occlusion device 100 may be, e.g., from about 1% to about 10% greater than the width of the blood vessel or from about 1% to about 10% less than the width of the blood vessel. When vascular occlusion device 100 is sized to be slightly larger than the blood vessel it will be used to occlude, vascular occlusion device 100 may be able to only partially return to its non-compressed state once a compression force is relieved (e.g., once vascular occlusion device 100 is deployed out of a catheter and into the blood vessel). In such embodiments, vascular occlusion device 100 is partially constrained by the blood vessel. This will also facilitate holding vascular occlusion device 100 at the target site in the blood vessel, which can further improve occlusion.

For example, vascular occlusion device 100 can be provided in any of a number of different sizes that are configured to fit within a target blood vessel. Exemplary vessels and their sizes are provided in Table 1.

TABLE 1

| Exemplary Vessels | |
|---|---|
| Vessel | Diameter |
| Aorta | 2 cm to 3 cm |
| Vein | 0.6 cm to 2 cm |
| Artery | 3 mm to 25 mm |
| Graft | 6 to 14 mm |
| Stent | 2.5 mm to 14 mm |
| Fistula | 0.5 cm to 2.5 cm |

Vascular occlusion device 100 may be sized to fit within, for example, an aorta (from about 2 cm to about 3 cm in diameter), an artery (from about 3 mm to about 25 mm in diameter), a vein (from about 0.6 cm to about 2 cm in diameter), a fistula (from about 0.5 cm to about 2.5 cm in diameter), a graft (from about 6 mm to about 14 mm), and a stent (from about 2.5 mm to about 14 mm). The width of vascular occlusion device 100 (e.g., within at least a middle portion) can be selected to match or slightly exceed (e.g., by about 1% to 10%) to maximum size of the blood vessel into which vascular occlusion device 100 will be placed.

Further examples of vessels that can be occluded using vascular occlusion device 100 include a vein, an artery, a stent, an arteriole, a capillary, a splenic artery, a gastroduodenal artery, a fistula, and a graft.

Vascular occlusion device 100 can adopt a first state (uncompressed state (e.g., a non-deformed or non-compacted shape)) and can be deformed or compacted to a second state (compressed state). In the uncompressed state, vascular occlusion device 100 can have a width from about 1 mm to about 30 mm (e.g., about 1-20 mm, about 5-20 mm, or about 5-15 mm). In the compressed state, vascular occlusion device 100 can have a width from about 0.5 mm to about 6 mm (see FIG. 3). The width of vascular occlusion device 100 in the compressed state, uncompressed state, or both may be variable along the length Vascular occlusion device 100 may be inserted into a blood vessel of a subject directly or with the assistance of delivery system 200 (see, e.g., FIG. 3). For example, vascular occlusion device 100 may be inserted into a blood vessel using components of delivery system 200, such as catheter 210, in a compressed state (e.g., a deformed or compacted shape) and delivered to the target blood vessel site and deployed into the blood vessel. Delivery system 200 can include, e.g., one or more of a catheter 210 (comprising a proximal end 211 and a distal end 212), a cartridge (comprising proximal opening 221, distal opening 222, and lumen 223), a guidewire, and a pusher (e.g., pusher 230). The components of delivery system 200 may be used to guide vascular occlusion device 100 to a target site in the blood vessel of a subject and to deploy vascular occlusion device 100 into the blood vessel so that it can occlude blood flow at the target site.

In some embodiments, the pusher may be pusher 230. Pusher 230 includes deployment shaft 231 and deployment hook 232 at the distal end of deployment shaft 231. Deployment hook 232 is configured to reversibly attach to proximal connector 170. For example, deployment hook 232 may fit within proximal connector 170, creating a reversible interlock.

Vascular occlusion device 100 may be provided in a compressed state inside cartridge 220. Cartridge 220 is designed such that it may house vascular occlusion device 100, in particular in the compressed state. During a vascular occlusion procedure, a distal end of cartridge 220 can be attached to a proximal end of catheter 210 (e.g., by a pressure fit), thereby establishing fluid communication between cartridge 220 and catheter 210. Vascular occlusion device 100 may then be transferred from cartridge 220 to catheter 210 (e.g., using a pusher (e.g., a rod or wire)). Once inside catheter 210, vascular occlusion device 100 can be navigated by the pusher through catheter 210 to a target site in a blood vessel where an occlusion is to be formed. At the target site, vascular occlusion device 100 may be released from catheter 210 by using the pusher to deploy vascular occlusion device 100 into the blood vessel. Once released from catheter 210, the compression force on vascular occlusion device 100 is relieved, thereby allowing vascular occlusion device 100 to return to a non-compressed state (e.g., vascular occlusion device 100 is able to adopt its non-deformed or non-compacted shape). By adopting the non-compressed state, vascular occlusion device 100 is able to contact the vessel wall, which fixes vascular occlusion device 100 in place in the vessel and creates an occlusion.

Alternatively, once vascular occlusion device 100 is navigated by the pusher through catheter 210 to the target site in the blood vessel where an occlusion is to be formed, the operator can hold vascular occlusion device 100 in place using the pusher while gently pulling back on catheter 210, thereby releasing vascular occlusion device 100 from catheter 210 and deploying vascular occlusion device 100 into the blood vessel at the target site. Once released from catheter 210, the compression force on vascular occlusion device 100 is relieved, thereby allowing vascular occlusion device 100 to return to a non-compressed state (e.g., vascular occlusion device 100 is able to adopt its non-deformed or non-compacted shape). By adopting the non-compressed state, vascular occlusion device 100 is able to contact the vessel wall, which fixes vascular occlusion device 100 in place in the vessel and creates an occlusion.

Helical Lattice

As shown in FIGS. 2A-2F, vascular occlusion device 100 includes a middle portion with helical lattice 130. Helical lattice 130 includes network of helical cells 140. Helical lattice 130 of vascular occlusion device 100 can include about 1 to about 25 turns (e.g., 1, 2, 3, 4, 5, 6 7 8, 9, 10, 11, 12, 13, 14, 15, 16, 17, 18, 19, 20, 21, 22, 23, 24, or 25 turns).

Each turn is defined by a pitch P, being the length along the first axis of vascular occlusion device 100 for helical lattice 130 to complete a single 360° rotation. Each turn may be of the same pitch or may have a different pitch. For example, each turn may have the same pitch of from about 1 mm to about 200 mm, e.g., from about 2 mm to about 190 mm, from about 3 mm to about 180 mm, from about 4 mm to about 170 mm, from about 5 mm to about 160 mm, from about 6 mm to about 150 mm, from about 7 mm to about 140 mm, from about 8 mm to about 130 mm, from about 9 mm to about 120 mm, about 10 mm, about 15 mm, about 20 mm, about 25 mm, about 30 mm, about 35 mm, about 40 mm, about 45 mm, about 50 mm, about 55 mm, about 60 mm, about 65 mm, about 70 mm, about 75 mm, about 80 mm, about 85 mm, about 90 mm, about 95 mm, about 100 mm, about 105 mm, about 110 mm, about 115 mm, etc. (see FIG. 1).

Helical lattice cells 140 are compressible (e.g., compactable or deformable). Helical lattice cells 140 may have any of a number of different shapes, such as a polygonal, square, rectangular, triangular, diamond, circular, elliptical, oval, oblong, lens, asteroid, deltoid, slit, or amorphous shape. The shape and/or area of each of lattice cells 140 of helical lattice 130 may be identical or all or a subset of lattice cells 140 may have a different shape. Helical lattice 130 may include more than one different shape and/or area of lattice cells 140, e.g., more than two different shapes and/or areas of lattice cells 140, more than three different shapes and/or areas of lattice cells 140, more than four different shapes and/or areas of lattice cells 140, more than five different shapes and/or areas of lattice cells 140, etc.

Helical lattice 130 may include first outer edge 150 and second outer edge 160, and disposed therebetween is network of lattice cells 140. First outer edge 150 and second outer edge 160 may join to form a structure at proximal end 110 and distal end 120, respectively. The structure may be a connector, e.g., a proximal connector 170 at proximal end 110 and/or a distal connector 180 at distal end 120. The connector may be, e.g., a loop, a hook, or a fastener.

Helical lattice 130 can be placed into the compressed state (e.g., a deformed or compacted shape) inside a component of delivery system 200, such as cartridge 220 or catheter 210. Helical lattice 130 may be compressed from the force of being placed inside of or being pulled into a component of delivery system 200. Helical lattice 130 may then be guided to the site of the occlusion by a component of delivery system 200 (e.g., a pusher (e.g., a rod or wire)). Helical lattice 130 may be allowed to return to an uncompressed state upon removal from a component of delivery system 200 (e.g., after being deployed into a blood vessel from catheter 210; see e.g., FIG. 3).

Helical lattice 130 includes a length defined along the first axis. The length of helical lattice 130 may be from about 10 mm to about 600 mm (e.g., a length of from about 20 mm to about 500 mm, from about 30 mm to about 400 mm, from about 40 mm to about 300 mm, from about 50 mm to about 200 mm, from about 60 mm to about 100 mm, or about 80 mm; FIG. 1). Helical lattice 130 includes a width defined along the second axis from about 1 mm to about 30 mm (e.g., about 1-20 mm, about 5-20 mm, or about 5-15 mm) wide when vascular occlusion device 100 is in the uncompressed state. The proximal portion and the distal portion of helical lattice 130 may be of the same width, or of different widths. In embodiments where the proximal portion and the distal portion are of different lengths, vascular occlusion device 130 may be referred to as "asymmetric."

The width of helical lattice 130 may be periodic along the length. Helical lattice 130 includes a thickness from about 0.01 mm to about 1 mm (e.g., from about 0.03 mm to about 0.8 mm, from about 0.05 mm to about 0.6 mm, from about 0.1 mm to about 0.4 mm, or from about 0.2 mm to about 0.3 mm) (see FIG. 2).

Helical lattice 130 may include one or more of barb 1100 (see FIGS. 4A-B). Barb 1100 may project outward from the first outer edge 150, the second outer edge 160, or both. Barb 1100 may project outward only when helical lattice 130 is uncompressed. Barb 1100 may be compressible about the second axis. When compressed, Barb 1100 may not significantly protrude from helical lattice 130. Helical lattice 130 and/or barb 1100 may include a texture (e.g., bumps, dimples, ridges, etc.). Textures may be located on the inner or outer surface of helical lattice 130.

Connectors

Vascular occlusion device 100 may include one or more connectors that can be used to interface with (e.g., attach to) a component of delivery system 200 (e.g., the pusher). The connector may be, e.g., a loop, fastener, hook, attraction device (e.g., a magnet), etc. Vascular occlusion device 100 may include a connector at proximal end 110 (i.e., proximal connector 170) and/or a connector at distal end 120 (i.e., distal connector 180). Vascular occlusion device 100 may include more than one of proximal connector 170 and/or more than one of distal connector 180. Proximal connector 170 and/or distal connector 180 may have a circular, semicircular, ovoid, or cylindrical shape. The connectors can have a thickness of between 0.01 mm and 1 mm. Vascular occlusion device 100 may interact with delivery system 200 through either proximal connector 170, distal connector 180, or both. Proximal connector 170 may be further configured to reversibly attach to a snare, allowing for retrieval and/or repositioning of vascular occlusion device 100. Proximal connector 170, distal connector 180, or both may interact with, e.g., the guidewire of delivery system 200, the pusher of delivery system 200, or a connector (e.g., a connector included with delivery system 200). Proximal connector 170 or distal connector 180 may be reversibly attached to delivery system 200 the guidewire of delivery system 200, the pusher of delivery system 200, or a connector (e.g., a connector included with delivery system 200). The guidewire may be threaded through the lumen of either proximal connector 170 or distal connector 180.

Tension (e.g., mechanical pressure through compression, twisting, or rotation) may be applied to the connector to induce a change in vascular occlusion device 100 from the uncompressed state to the compressed state of vascular occlusion device 100. The removal of tension (e.g., the removal of compression) may induce a change from a compressed state to an uncompressed state. The connectors of vascular occlusion device 100 may include a lumen configured to accommodate a guidewire with an internal diameter from about 0.2 mm to about 1 mm.

Filaments

Figure 5A:
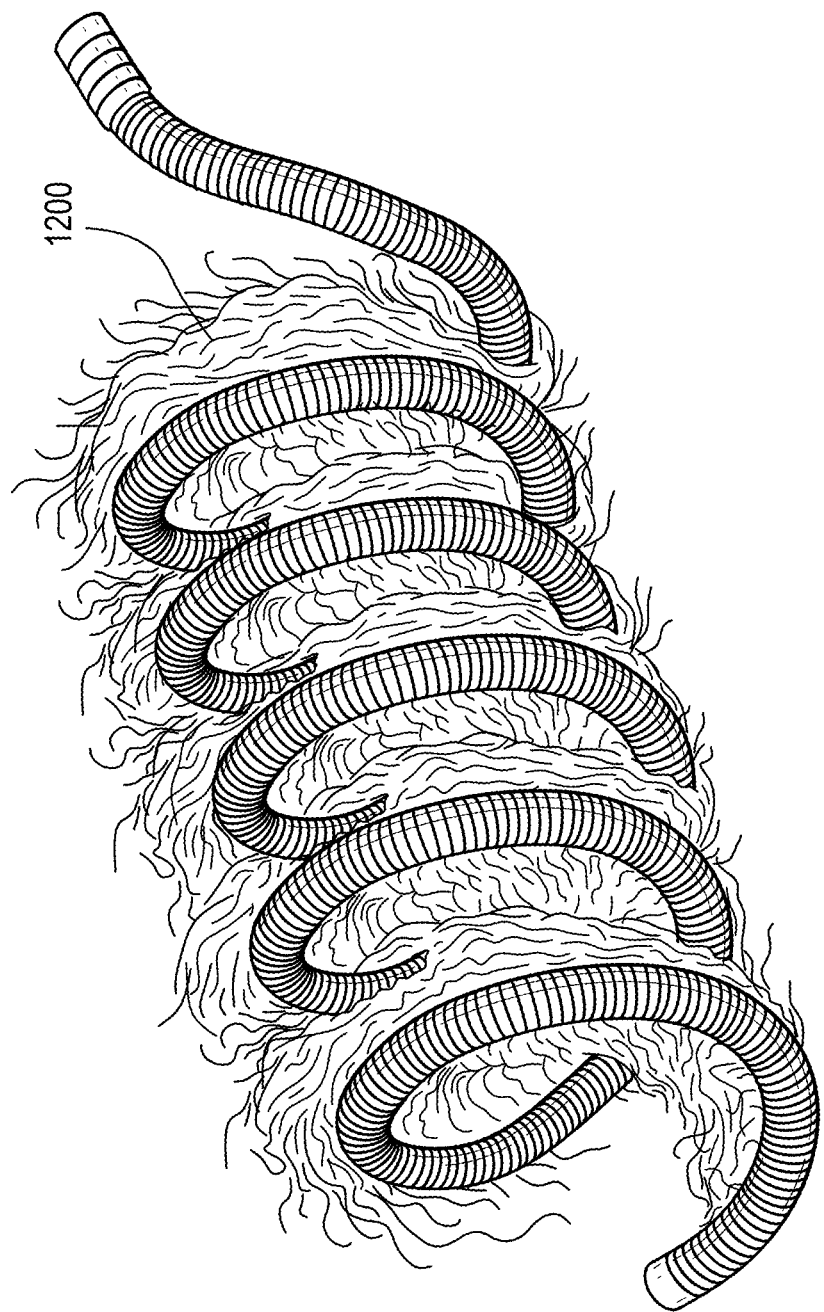
FIGS. 5A and 5B are photographs of a prior art vascular device showing filaments 1200. Vascular occlusion device 100 of FIGS. 1-4 can be modified to include a surrounding layer of fibrous material, such as filaments 1200, or a similar type of material. The image of FIG. 5A is reproduced from Trerotola et al. (*J. Vasc. Interv. Radiol.* 30(6):949-955, 2019). The image from FIG. 5B is reproduced from Kim (*J. Cerebrovasc. Endovasc. Neurosurg.* 15(2), 2013).
Figure 5B:
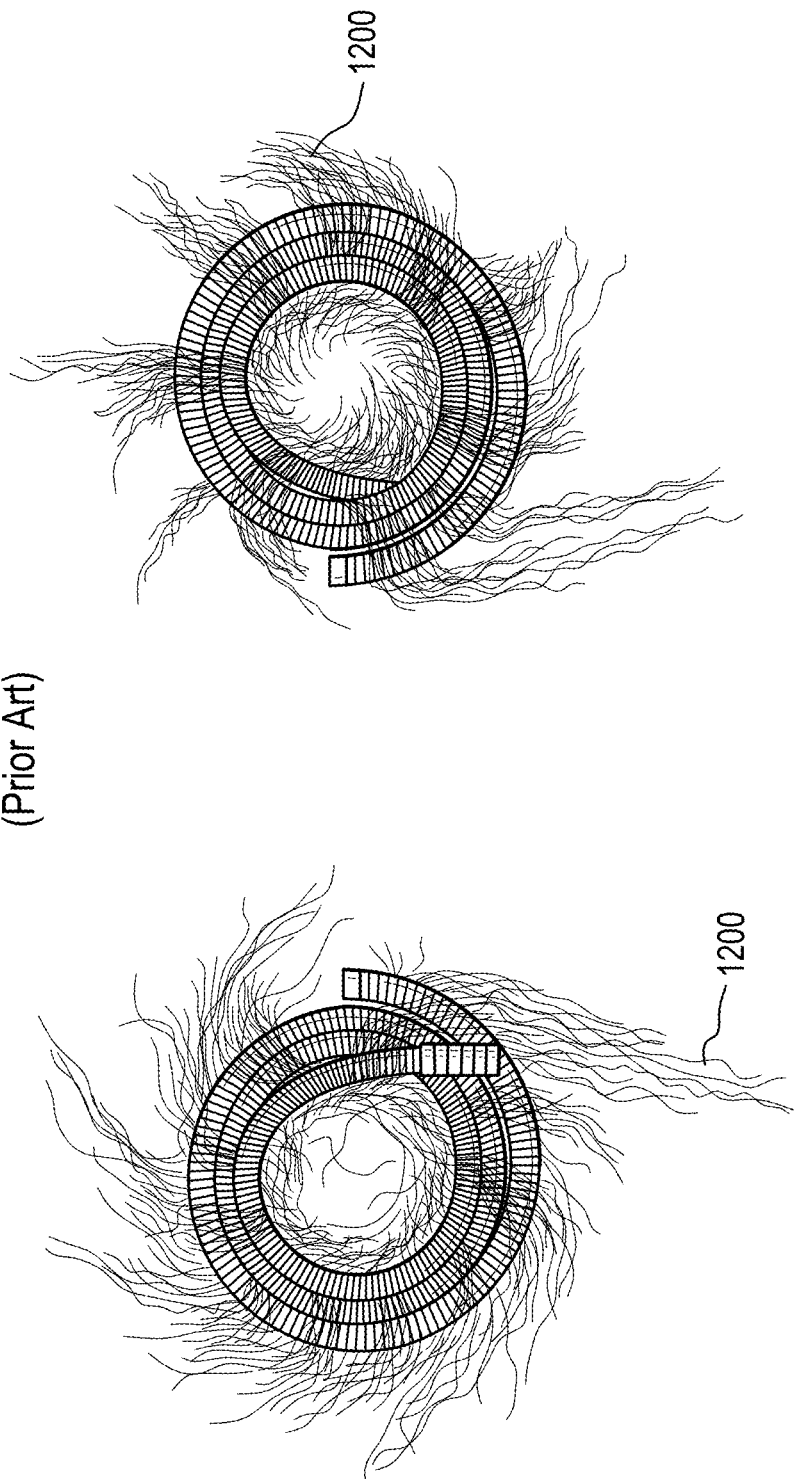
Figure 6:
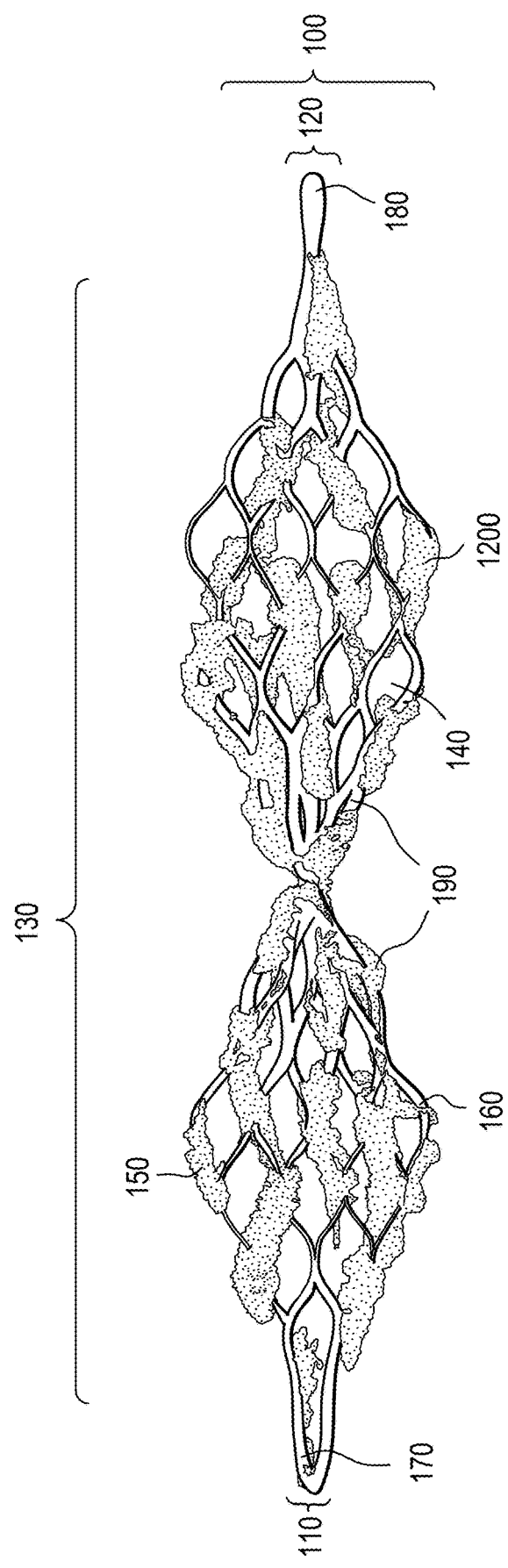
FIG. 6 is a depiction of vascular occlusion device 100 including filaments 1200, such as those shown in FIGS. 5A and 5B. In such embodiments, coating 190 may be added to filaments 1200, helical lattice 130, or both.

Vascular occlusion device 100 can include a plurality of filaments 1200. Filaments 1200 that are incorporated into or onto vascular occlusion device 100 may be the same or similar to filaments known in the art that have been used with other types of vascular devices (see, e.g., U.S. Pat. Nos. 8,535,700; 5,658,308; 5,792,154; 5,935,145; 6,001,092; 6,033,423; 6,280,457; and 6,299,627; as well as Trerotola et al. (*J. Vasc. Interv. Radiol.* 30(6):949-955, 2019) and Kim (*J. Cerebrovasc. Endovasc. Neurosurg.* 15(2), 2013); each of which are incorporated herein by reference). Filaments, such as those shown in FIGS. 5A-5B, can be incorporated into vascular occlusion device 100, such as is shown in FIG. 6. Similar or identical filaments may be included with vascular occlusion device 100 as described herein.

Filaments 1200 are or can include a natural or synthetic polymer. The natural or synthetic polymer can include polyester, polyurethanes, polyethers, polyamides (e.g., nylon polymers and their derivatives), polyimides, polyacrylates, epoxies, olefins (e.g., polyethylene, polypropylene, polybutadiene, polystyrene, etc.) and copolymers thereof, fluorinated polymers (e.g., polytetrafluoroethylene), siloxane-based polymers, cellulose, Rayon, rubbers, polyesters, glycosides, caprolactone polymers, hydroxybutyrate, and polyhydroxy valerate.

Filaments 1200 may be attached to vascular occlusion device 100, e.g., through an adhesive or heat treatment. Filaments 1200 may be attached to helical lattice 130, in which at least a portion of filaments 1200 extend radially from helical lattice 130. Filaments 1200 can include coating 190.

Coatings

In some embodiments, all or a portion of vascular occlusion device 100 can include coating 190. Coating 190 may, e.g., be an agent (e.g., a therapeutic agent) that facilitates blood coagulation, stimulates repair of the vasculature of the subject, reduces the risk of secondary infection in the subject, lubricates vascular occlusion device 100, or increases the operational lifetime of vascular occlusion device 100. Coating 190 may be included on helical lattice 130 or filaments 1200. Helical lattice 130 and/or filaments 1200 may include coated portions, uncoated portions, or both. Helical lattice 130 and/or filaments 1200 may include only coated portions.

The agent of coating 190 may be or may include a thrombogenic agent or a pro-fibrotic material (e.g., a thrombin-or fibrinogen-containing composition). Exemplary coatings are known in the art (see, e.g., U.S. Pat. No. 8,535,700, the entirety of which is incorporated herein by reference).

Coating 190 can also include a hydrogel. The hydrogel can be one that is capable of expanding upon exposure to aqueous media and/or physiological fluid, e.g., blood, or components thereof. In some embodiments, the hydrogel can include a polysaccharide, a mucopolysaccharides, a carboxy alkyl cellulose, a synthetic polymer, or a protein. Other exemplary hydrogels are known in the art (see, e.g., U.S. Pat. Nos. 11,090,078; 7,220,270; 8,535,700; and 8,163, 362; each of which are incorporated herein by reference).

Radiopaque Markers

In some embodiments, vascular occlusion device 100 can include a radiopaque marker. Radiopaque markers, and inclusion thereof in vascular devices are known in the art (see, e.g., U.S. patent application Ser. No. 13/793,474; Ser. No. 17/152,581; Ser. No. 15/183,468; and U.S. Pat. Nos. 8,123,777; 10,517,605; 7,938,820; and 9,060,802; each of which are incorporated herein by reference).

The radiopaque markers may be included along the entire length of vascular occlusion device 100 or only a portion thereof. For example, the radiopaque markers may be included at proximal end 110, distal end 120, or both.

Delivery System

Vascular occlusion device 100 may be included with (e.g., as part of a kit) or used in conjunction with (e.g., during a vascular occlusion procedure) one or more components of a delivery system. The components of delivery system 200 may be used to deploy vascular occlusion device 100 at a desired site in the vasculature of the subject. Delivery system 200 may include vascular occlusion device 100 and one or more additional components, such as catheter 210, cartridge 220, a guidewire, a pusher (e.g., a rod or wire), or a snare.

Figure 7:
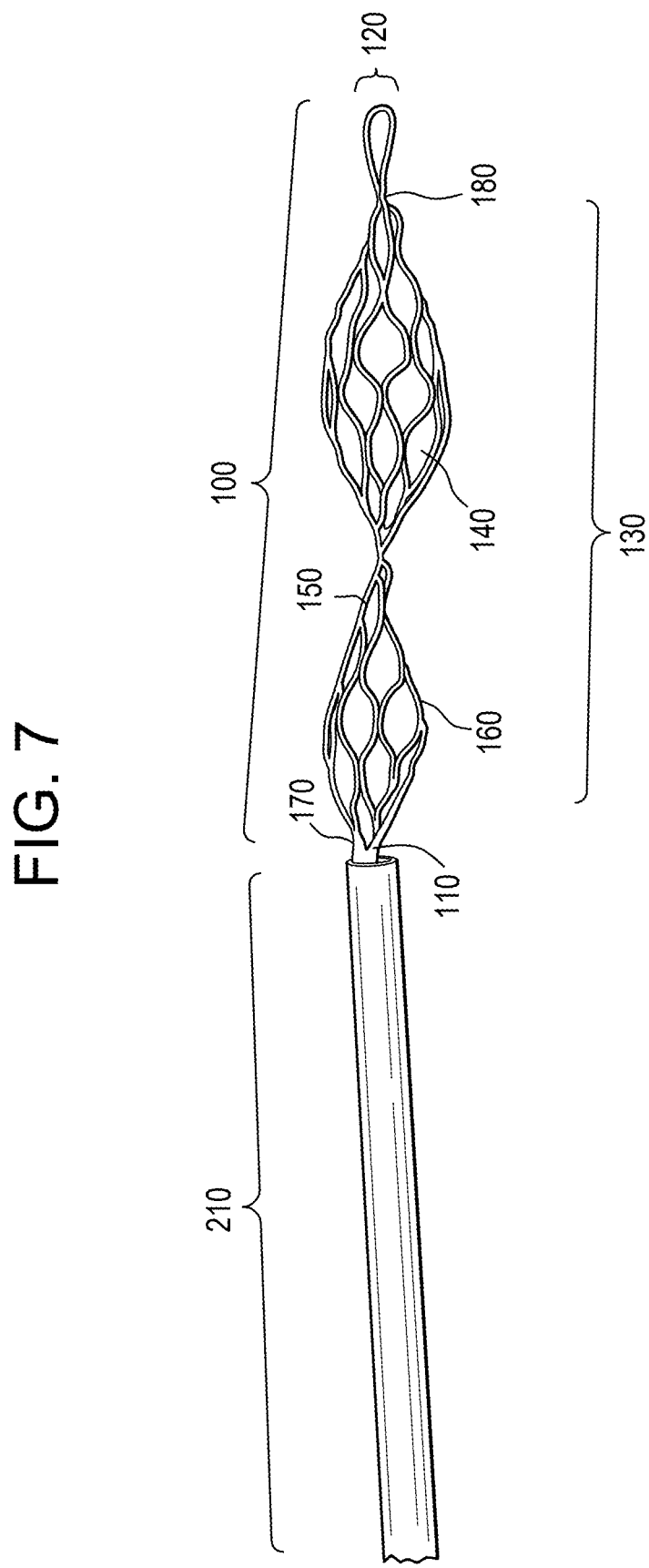
FIG. 7 is an image of vascular occlusion device 100 partially inserted into delivery system 200, which includes catheter 210.

Catheter 210 of delivery system 200 has proximal end 211 and distal end 212 and a length therebetween containing a lumen spanning the length of catheter 210. The length of catheter 210 is sufficient to navigate the vasculature of the subject. Catheter 210 may include an inner diameter of at most 30 mm and an outer diameter less than the diameter of the vessel in which vascular occlusion device 100 is to be deployed. Catheter 210 may be sized to maintain vascular occlusion device 100 in a compressed state (e.g., a deformed or compacted state) when vascular occlusion device 100 is inserted inside catheter 210. Catheter 210 may also be used during a vascular occlusion procedure to deliver a therapeutic agent to a desired site in the vasculature of the subject (e.g., as an infuser). In such embodiments, a therapeutic agent may be administered (e.g., via a syringe through an infusion port) via proximal end 211 of catheter 210. An image of vascular occlusion device 100 partially deployed from catheter 210 is shown in FIG. 7.

Figure 8:
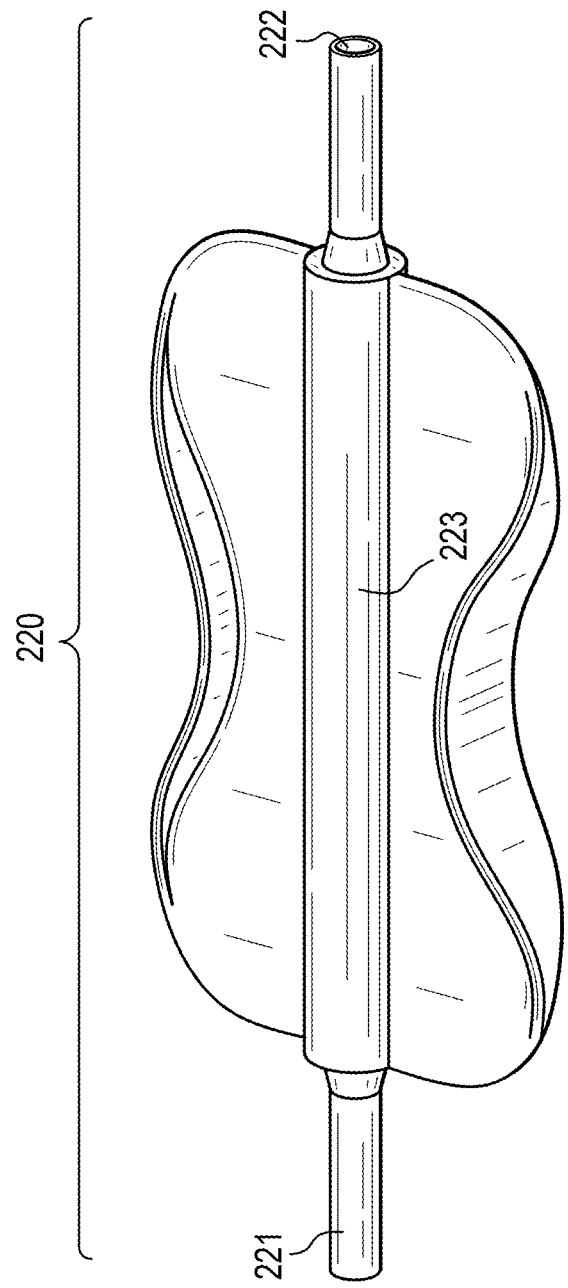
FIG. 8 is an image of cartridge 220 including a proximal end 221, a distal end 222, and a lumen 223 therebetween. Distal end 222 may include a structure designed to interface with proximal end 211 of catheter 210. Vascular occlusion device 100 may be pre-loaded inside lumen 223.
Figure 9A:
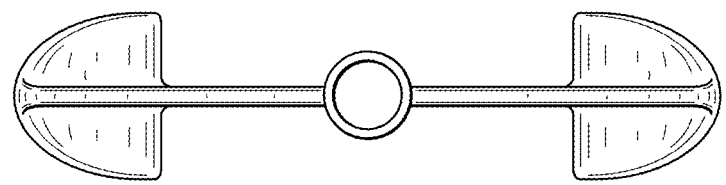
FIGS. 9A-9F show cartridge 220 from a front view (FIG. 9A), a top view (FIG. 9B), a side view (FIG. 9C), and a perspective view (FIG. 9D).
Figure 9B:
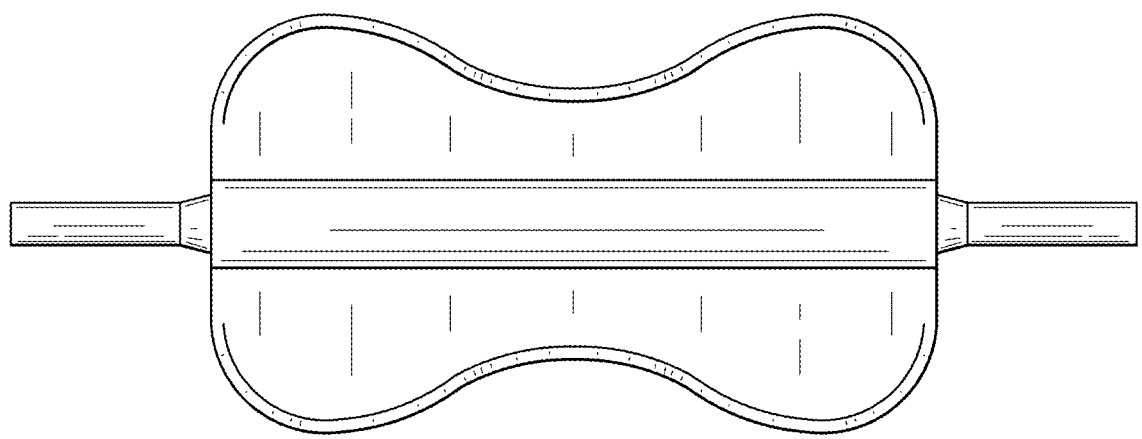
Figure 9C:
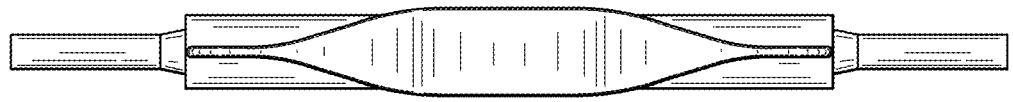
Figure 9D:
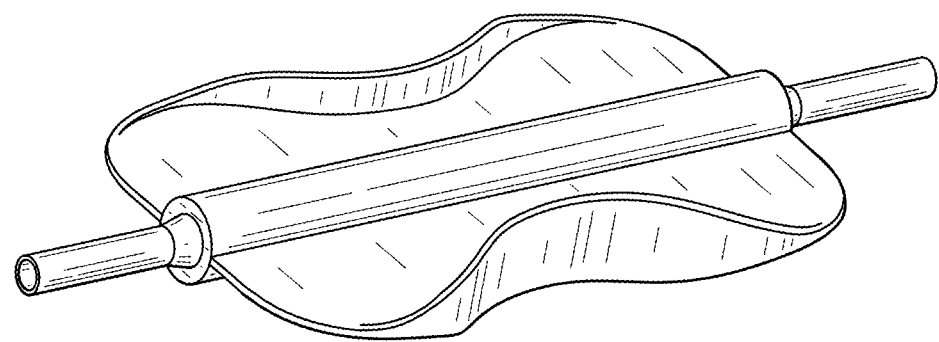
Figure 9E:
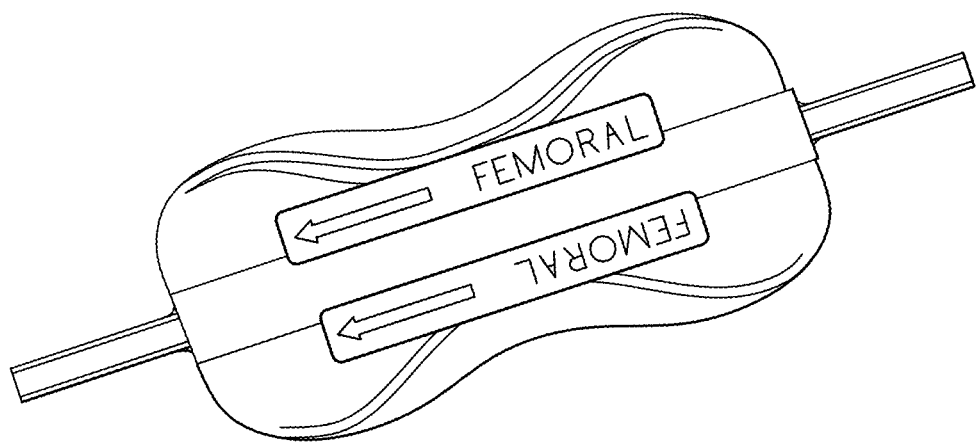
Figure 9F:
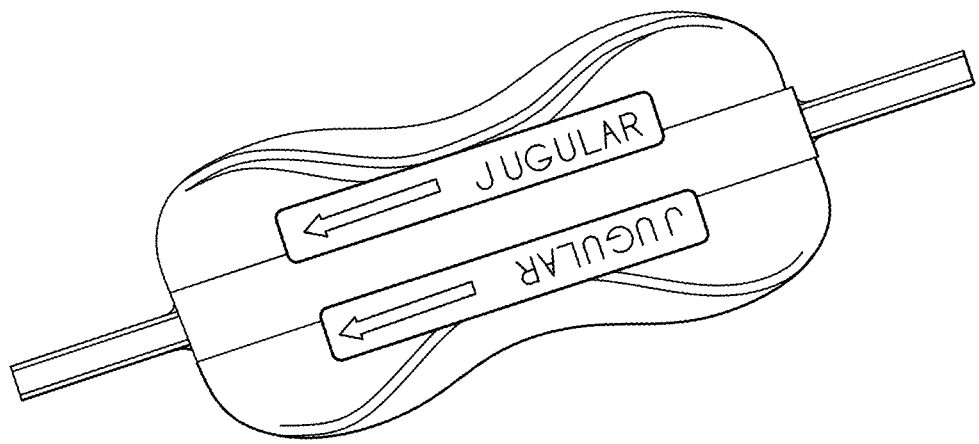

Cartridge 220, which is shown in FIGS. 8 and 9, includes proximal opening 221, distal opening 222, and lumen 223 therebetween that provides fluid communication between proximal opening 221 and distal opening 222. Proximal opening 221 may include a lumen with a diameter of at least the diameter of the pusher. Distal opening 222 may include a connector that is designed to attach to proximal end 211 of catheter 210 (e.g., distal opening 222 may include a structure designed to be pressure fit with proximal end 211). The connector may include an outer diameter of less than the inner diameter of catheter 210. Distal opening 222 may further include a lumen (e.g., a lumen in the structure designed to provide fluid communication with proximal end 211 of catheter 210). Lumen 223, spanning the length of cartridge 220 from proximal opening 221 to distal opening 222, may be sized to contain vascular occlusion device 100 in the compressed state (i.e., vascular occlusion device 100 can be pre-loaded inside lumen 223 of cartridge 220). Vascular occlusion device 100 may be stored inside cartridge 220, e.g., in lumen 223, prior to device deployment.

Figure 10A:
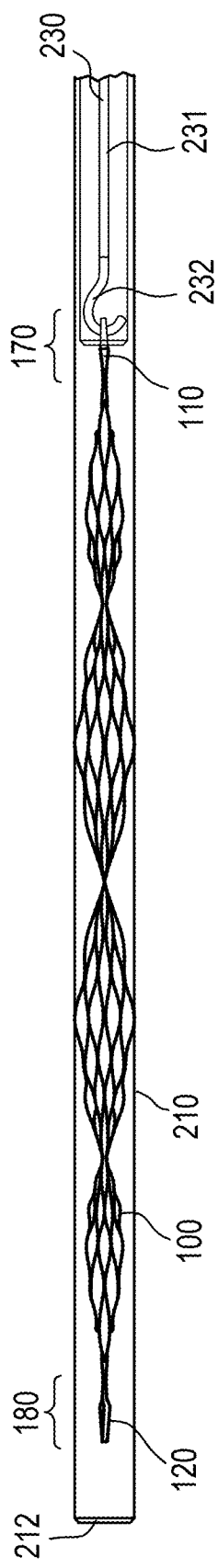
FIGS. 10A-10C illustrate the deployment of vascular occlusion device 100 into the vasculature of a subject.
Figure 10C:
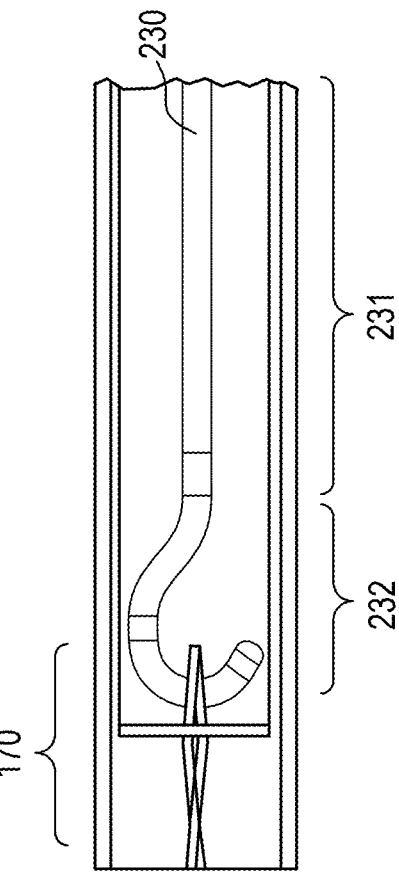
Figure 10B:
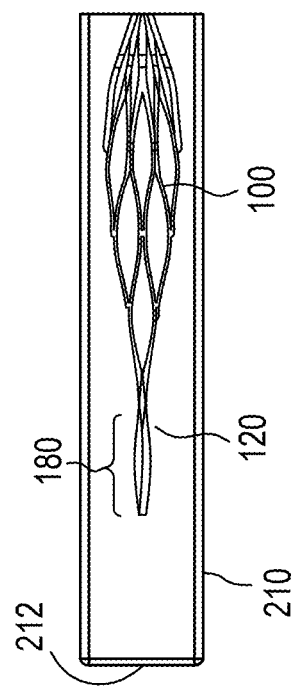

A pusher (e.g., a rod or wire, e.g., pusher 230) of delivery system 200 may include a structure designed to engage with proximal connector 170 of vascular occlusion device 100. In some embodiments, the structure is deployment hook 232. The pusher (e.g., pusher 230) can be used to apply a biasing force to vascular occlusion device 100 in order to deploy it out of cartridge 220 and into catheter 210 and out of catheter 210 and into a blood vessel at a target site for vascular occlusion. The pusher may be, or may include, a rod or a wire. In some embodiments, the pusher is pusher 230. Pusher 230 may have a diameter that is at most equal to the inner diameter of catheter 210. Engagement of proximal connector 170 with the pusher may be by a hook and loop configuration (e.g., deployment hook 232, configured to engage with a structure (e.g., a loop) at proximal connector 170) or other suitable mechanical connection. The pusher can be used to guide vascular occlusion device 100 through cartridge 220 and/or catheter 210 by applying gentle but firm mechanical force to proximal connector 170, which moves vascular occlusion device 100 forward. The attachment between pusher 230 and proximal connector 170 may be reversible. For example, pusher 230 and proximal connector 170 may be rotationally engaged (e.g., the pusher may have a hook structure at its distal end that is configured to engage with a loop structure of proximal connection 170). An example of a rotational engagement between deployment hook 232 of pusher 230 and proximal connector 170 is shown in FIG. 10A-10C. Alternatively, a pusher and proximal connector 170 may be reversibly attached via a screw, a snap, or by an attraction force (e.g., by using magnetized components). It is also envisioned that proximal connector 170 and the pusher could be fixedly joined. If desired, the pusher may be used not only to deploy vascular occlusion device 100 during a vascular occlusion procedure, but also to retrieve and remove vascular occlusion device 100 from the vasculature after completion of the procedure or treatment. For example, deployment hook 232 may be configured to reengage with proximal connector 170. After reengagement, deployment shaft 231 may be retreated along the length of catheter 210, thereby retracting vascular occlusion device 100 into the lumen of catheter 210, e.g., by compressing vascular occlusion device 100 into the compressed state.

Delivery system 200 may include deployment device 240 designed to be held by an operator that is configured to apply force (e.g., to the proximal end of pusher 230) to advance vascular occlusion device 100 along the length of catheter 210. Deployment device 240 includes a proximal end configured to interface with the proximal end of deployment shaft 231, proximal end 211 of catheter 210, and/or the proximal end of the guidewire. Deployment device 240 may further include inlet port 241. Inlet port 241 is configured to be placed in fluid communication with a fluid (e.g., a saline solution with or without a medicament (e.g., an IV bag). When interfacing deployment device 240 with proximal end 211 of catheter 210, inlet port 241 may be placed in fluid communication with the lumen of catheter 210. A medicament applied via inlet port 241 may then flow through the lumen of catheter 210 to the target site in the vasculature of the subject.

Figure 12B:
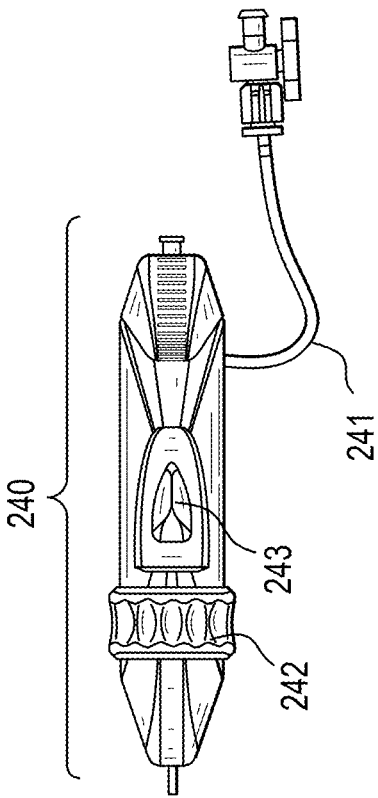
FIGS. 12A-12D show deployment device 240 including inlet port 241, rotary actuator 242, and deployment release 243.
Figure 12A:
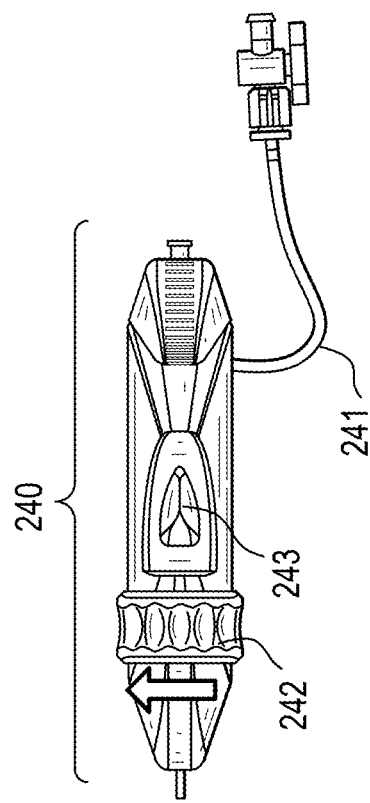
Figure 12C:
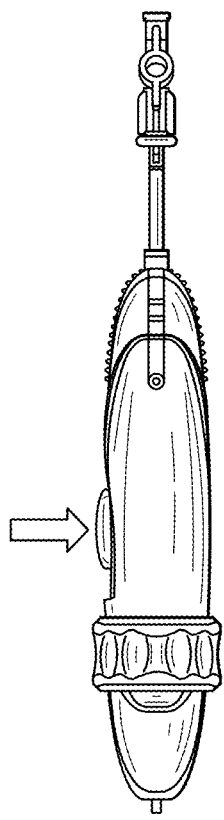
Figure 12D:
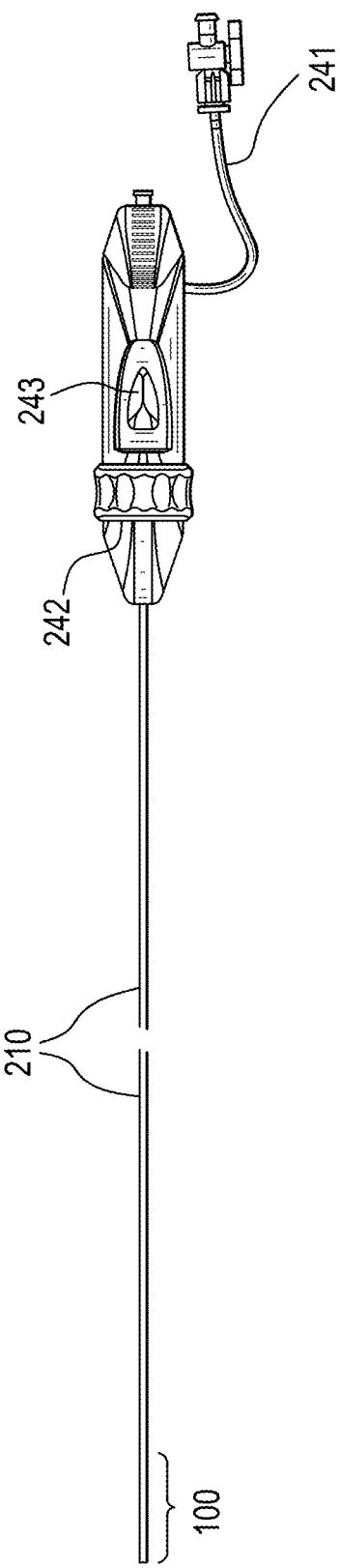

Deployment device 240 may further include an actuator. The actuator engages with proximal end 211 of catheter 210. By manipulating the actuator or a secondary component coupled thereto, catheter 210 may be extended from the body of deployment device 240 or retracted into the body of deployment device 210. The actuator may function by rotation (e.g., rotating the actuator retracts or deploys catheter 210 from the body of deployment device 240, e.g., rotary actuator 242) or a slide (e.g., moving the actuator along a length of deployment device 240 retracts or deploys catheter 210 from the body of deployment device 240). An example of rotary actuator 242 is shown in FIG. 12A-12C. Deployment device 240 may further include deployment release 243. Deployment release 243 may be mechanically or electronically coupled to deployment hook 232 via a mechanical or electrical component included in deployment shaft 231. Operating deployment release 243 (e.g., depressing, rotating, or sliding deployment release 243) manipulates deployment hook 232. For example, when deployment hook 232 is engaged with vascular occlusion device 100 via proximal connector 170, operating deployment release 243 may raise deployment hook 232, causing pusher 230 to disengage from proximal connector 170, thereby releasing vascular occlusion device 100. Alternatively, when deployment hook is not engaged with vascular occlusion device 100 via proximal connector 170, operating deployment release 243 may lower deployment hook 232, rotatably engaging deployment hook 232 with proximal connector 170, thereby engaging pusher 230 with vascular occlusion device 100. An example of deployment release 243 is shown in FIG. 12C.

Delivery system 200 may include a snare. The snare is configured to reversibly attach to proximal connector 170

(e.g., using methods described herein). If the position of vascular occlusion device 100 is not satisfactory, a snare can be advanced through catheter 210 and reversible attach to vascular occlusion device 100. The snare and vascular occlusion device 210 may then be retracted into the lumen of catheter 210, converting vascular occlusion device 100 to the compressed state. Vascular occlusion device 100 may then be repositioned. Once in the desired position, vascular occlusion device 100 may be redeployed from the lumen of catheter 210 into the vasculature of the subject, and expand into the uncompressed state.

Vascular occlusion device 100 may be compressed within catheter 210 or cartridge 220. Vascular occlusion device 100 may be delivered to a target vascular site using methods developed for different types of vascular devices (see, e.g., U.S. Pat. Nos. 10,695,159; 10,786,268; 8,734,374; and 5,702,413 and US 2010/0204712, the entire contents of which are incorporated by reference). Such methods may also be applied to the systems and devices herein.

Exemplary guidewires that can be used as part of delivery system 200 are known in the art (see, e.g., U.S. patent application Ser. No. 11/314,924 and Ser. No. 17/240,591; the entirety of which is incorporated herein by reference). The guidewire may be included within or sized to fit within the lumen of catheter 210.

Methods of Use

Vascular occlusion device 100 and delivery system 200 may be used during a vascular occlusion procedure to occlude blood flow in a target blood vessel. In particular, vascular occlusion device 100 can be used in a method of occluding a blood vessel by, for example: a) inserting vascular occlusion device 100 in a compressed state (e.g., in a deformed or compacted shape) into a blood vessel; and b) deploying vascular occlusion device 100 at a target site in the blood vessel, whereby vascular occlusion device 100 converts to an uncompressed state (e.g., a non-deformed or non-compacted shape). Vascular occlusion device 100 can be provided in a compressed state inside catheter 210 or cartridge 220 of delivery system 200.

Vascular occlusion device 100 may be provided pre-loaded in cartridge 220. If so, the procedure involves attaching distal end 222 of cartridge 220 to proximal end 211 of catheter 210 to establish fluid communication therebetween and pushing vascular occlusion device 100 out of cartridge 220 and into catheter 210, e.g., by using the pusher. Distal end 212 of catheter 210 can be maneuvered to a site of a blood vessel in need of occlusion. Subsequently, vascular occlusion device 100 can be navigated to distal end 212 of catheter 210, e.g., by using the pusher (e.g., a rod or wire, e.g., pusher 230). The pusher may be reversibly attached to vascular occlusion device 100 (e.g., through rotational engagement between a connector included with the pusher and proximal connector 170). When vascular occlusion device 100 arrives at the occlusion site of the blood vessel, the pusher can be used to deploy vascular occlusion device 100 out of catheter 210 and into the blood vessel. Once deployed, vascular occlusion device 100 adopts a non-compressed state (to the extent allowed based on the size of the blood vessel), thereby becoming fixedly secured at the target site. Deployment of vascular occlusion device 100 then promotes occlusion of the blood vessel. If vascular occlusion device 100 is to remain in the vessel, catheter 210 can be removed from the vessel and the insertion site can be closed.

Distal end 212 of catheter 210 may be placed at the site of desired occlusion, or it may be placed at an adjacent site. Distal opening 222 of cartridge 220 may then be fit into proximal end 211 of catheter 210 (e.g., via the connector that is designed to attach to proximal end 211 of catheter 210), optionally by threading the guidewire through the lumen of proximal connector 170 or distal connector 180. Pusher 230 of delivery system 200 may then be fed into the proximal opening of cartridge 220). Deployment hook 232 at the distal end of pusher 230 may then engage with proximal connector 170 at proximal end 110 of vascular occlusion device 100. Pusher 230 may then be used to apply force to vascular occlusion device 100 (e.g., through proximal connector 170), which then pushes vascular occlusion device 100 out of lumen 223 of cartridge 220 and into the lumen of catheter 210. Force can continue to be applied using pusher 230 to push vascular occlusion device 100 along the length of catheter 210. Vascular occlusion device 100 may then be pushed out of distal end 212 of catheter 210. Once deployed from catheter 210, vascular occlusion device 100 may then self-expand to occlude the vessel.

Alternatively, delivery system 200 may include a guidewire. The guidewire may be inserted into the lumen of catheter 210. The guidewire may traverse into the vasculature of the subject and be navigated to a desired site in the vasculature. Positioning the guidewire and catheter 210 may include creating an incision in the blood vessel of a subject (e.g., in the femoral artery of the subject) and feeding the guidewire and catheter 210 into the incision to gain access to the vasculature of the subject. The pusher can be used to move vascular occlusion device 100 along the length of the guidewire until it reaches the desired site in the vasculature of the subject. Once vascular occlusion device 100 is positioned, the guidewire may be removed from the vasculature.

A snare may be used to reposition vascular occlusion device 100. The snare can be advanced through catheter 210 (e.g., using the pusher of delivery system 200 or a similar mechanism) and reversibly attached to vascular occlusion device 100. The snare and vascular occlusion device 100 may then be retracted into the lumen of catheter 210, converting vascular occlusion device 100 to the compressed state. Vascular occlusion device 100 may then be repositioned by moving catheter 210 to a desired position. Once in the desired position, vascular occlusion device 100 may be redeployed from the lumen of catheter 210 into the vasculature of the subject (e.g., using the pusher), resulting in the conversion of vascular occlusion device back to the uncompressed state.

An exemplary method of deployment is shown in FIG. 11. Vascular occlusion device 100 is reversibly attached to pusher 230 via deployment hook 232. In this exemplary method, vascular occlusion device 100 advanced to the distal end of catheter 210 (step (1)). Advancing the vascular occlusion device 100 may include advancing vascular occlusion device 100 over a guidewire. Once located at the desired site, the catheter is retracted, allowing vascular occlusion device 100 to expand into the uncompressed state (steps (1) to (2)). Finally, deployment hook 232 disengages from vascular occlusion device 100, thereby deploying vascular occlusion device 100 in the vasculature of the subject (step (4)).

Pusher 230 and/or catheter 210 may interface with deployment device 240. Deployment device 240 allows manipulation of pusher 230 (e.g., by applying pressure to the proximal end of pusher 230 through deployment device 240) to locate pusher 230 attached to vascular occlusion device 100 at the target site in the vasculature of the subject. Deployment device 240 further includes an actuator which interfaces with catheter 210. Operation of rotary actuator 242 allows for the extension or retraction of catheter 210

(e.g., along a guidewire). For example, catheter 210 may be retracted, thereby releasing vascular occlusion device 100 from catheter 210 and converting vascular occlusion device 100 from the compressed state to the uncompressed state. Alternatively, catheter 210 may be extended, thereby recapturing vascular occlusion device 100 within catheter 210, and converting vascular occlusion device 100 to the compressed state.

Deployment device 240 may further include inlet port 241. Inlet port 241 is configured to be placed in fluid communication with a solution (e.g., a saline solution, which may include a medicament, such as in the form of an IV bag). When interfacing deployment device 240 with proximal end 211 of catheter 210, inlet port 241 may be placed in fluid communication with the lumen of catheter 210. A solution applied via inlet port 241 may then flow through the lumen of catheter 210 to the target site in the vasculature of the subject. Vascular occlusion device 100 may be used to partially or completely restrict blood flow in the subject. The subject's blood flow may be reduced to, e.g., less than about 60 mL/s, less than about 50 mL/s, less than about 40 mL/s, less than about 30 mL/s, less than about 20 mL/s, less than about 10 mL/s, less than about 5 mL/s less than about 4 mL/s, less than about 3 mL/s, less than about 2 mL/s, less than about 1 mL/s, about 0 mL/s, etc. If vascular occlusion device 100 is not intended to remain in the body of the subject indefinitely, vascular occlusion device 100 may be used to restrict the subject's blood flow for a desired period of time, such as for less than 1 hour, e.g., less than 30 minutes, less than 20 minutes, less than 15 minutes, less than 10 minutes, less than 5 minutes, etc. Alternatively, blood flow may be restricted by vascular occlusion device 100 for a duration of longer than 1 hour (e.g., indefinitely).

In embodiments where it is desired to apply a therapeutic or diagnostic agent during treatment, cartridge 220 may be removed from proximal end 211 of catheter 210 (e.g., after deployment of vascular occlusion device 100 and removal of the pusher from catheter 210. A therapeutic or diagnostic agent may then be delivered (e.g., infused) via proximal end 211. In such embodiments, catheter 210 may be used (e.g., as an infuser) to deliver the therapeutic or diagnostic agent to the target site of the blood vessel.

Vascular occlusion device 100 or a delivery system that includes vascular occlusion device 100, as described herein, can be used in the treatment of a number of injuries, diseases, disorders, and pathological conditions. Examples include: hemorrhages, preoperative devascularization of organs and tumors, ruptured aortic aneurysms, arteriovenous malformations, neurovascular abnormalities, arteriovenous fistulas, intracranial aneurysms, amelioration of vascular bleeding incurred during treatment of any disease or disease, hepatic growth stimulation, pelvic venous congestion syndrome, congenital or acquired vascular malformations, varicocele, and restriction of blood flow in a subject undergoing a surgical or imaging procedure (e.g., angiography). Vascular occlusion device 100 may be used to ameliorate vascular bleeding incurred during treatment of any disease or disease. Vascular occlusion device 100 can be used to treat any pathological conditions known in the art to be treatable with occlusion.

Vascular occlusion device 100 may be used in the treatment of cancer, e.g., by occluding a vessel in the vicinity of the tumor to prevent blood flow to the tumor. If desired, an antitumor agent could then be infused via catheter 210. Additionally, either the same or a different antitumor agent may be included as coating 190.

Vascular occlusion device 100 may be engaged with a blood vessel, i.e., occluding flow through the vessel, during the entirety of a medical procedure, or for only a portion of the time of the procedure. The time during which vascular occlusion device 100 is in use may depend on the need for the restriction of blood flow in the subject during the medical procedure.

Kits

The present disclosure features kits containing vascular occlusion device 100 and one or more additional components, such as one or more components of delivery system 200. The one or more components may include one or more of a catheter (e.g., catheter 210), a guidewire, a pusher (e.g., pusher 230), and a cartridge (e.g., cartridge 220). The cartridge may be supplied in the kit with vascular occlusion device 100 pre-loaded inside a lumen thereof. The kit and its components can be used in a vascular occlusion procedure, during which vascular occlusion device 100 is deployed, using the components of the kit, at a target site in a blood vessel requiring occlusion of blood flow.

Methods of Making

Vascular occlusion device 100 and other components disclosed herein can be manufactured using methods known in the art, including, e.g., machining, injection molding, additive manufacturing (3D-printing), laser cutting, shape setting, or a combination thereof. Vascular occlusion device 100 may then be loaded into cartridge 220. This may include compressing vascular occlusion device 100 inside of cartridge 220, or making cartridge 220 (e.g., through a method described herein) and then fitting cartridge 220 around vascular occlusion device 100.

EXAMPLES

The following examples are put forth so as to provide those of ordinary skill in the art with a description of how the compositions and methods described herein may be used, made, and evaluated, and are intended to be purely exemplary of the invention and are not intended to limit the scope of the invention.

Example 1: Use of a Vascular Occlusion Device

This example demonstrates use of vascular occlusion device 100 in the treatment of a traumatic injury, e.g., traumatic splenic injury.

An incision is made to the right common femoral artery using a prior art technique. A 6 Fr sheath is then placed in the artery. The celiac artery is then catheterized through the sheath using a guidewire and a curved catheter (e.g., SosOmni). The position of the vascular injury (e.g., vascular bleed) is monitored via angiography. The curved catheter is then exchanged for a 4-Fr straight glide catheter which will be advanced to appropriate location in the splenic artery. A cartridge containing vascular occlusion device 100 is attached to the proximal hub of the 4 Fr catheter. A pusher rod is used to push vascular occlusion device 100 into the catheter and towards the intended location of deployment. Advancement of vascular occlusion device 100 within the catheter is monitored in real time under fluoroscopy using radiopaque markers on the device. When vascular occlusion device 100 is in the correct position, vascular occlusion device 100 will be held in place by the pusher rod and the 4-Fr catheter is slowly pulled back to deploy (e.g., unsheathe) vascular occlusion device 100.

If the position of vascular occlusion device 100 is not satisfactory, a snare can be advanced through the 4-Fr catheter and a neck of vascular occlusion device 100 (e.g., a segment between the proximal connector and the body of vascular occlusion device 100) can be captured by the snare.

Vascular occlusion device 100 can be pulled back into the 4-Fr catheter (e.g., "sheathed"). The sheathed vascular occlusion device 100 is then appropriately positioned and deployed again.

Example 2: Deployment of a Vascular Occlusion Device

This example demonstrates the deployment of vascular occlusion device 100 using delivery system 200 in the treatment of a traumatic injury, e.g., traumatic splenic injury.

An incision is made to the right common femoral artery using a prior art technique. A 6 Fr sheath is then placed in the artery. The celiac artery is then catheterized through the sheath using a guidewire and a curved catheter (e.g., SosOmni). The position of the vascular injury (e.g., vascular bleed) is monitored via angiography. The curved catheter is then exchanged for catheter 210. The catheter is then advanced to an appropriate location in the vasculature of the subject. Cartridge 220 containing vascular occlusion device 100 is attached to proximal end 211 of catheter 210. Deployment hook 232 of pusher 230 is attached to proximal connector 170 at proximal end 110 of vascular occlusion device 100. The proximal end of deployment shaft 231 of pusher 230 is attached to deployment device 240. A biasing force is applied to pusher 230 through deployment device 240, transferring vascular occlusion device 100 from cartridge 220 to catheter 210. The biasing force is then continued to advance vascular occlusion device 100 to an appropriate location in the vasculature of the subject. Advancement of vascular occlusion device 100 within the catheter is monitored in real time under fluoroscopy using radiopaque markers on the device.

Once vascular occlusion device 100 is positioned at the appropriate location, rotary actuator 242 is operated in order to retract the catheter, allowing vascular occlusion device 100 to expand to the uncompressed state. Deployment release 243 is then operated, raising deployment hook 232, thereby disassociating deployment hook 232 from proximal connector 170.

During deployment, a medicament may be applied via inlet port 241 of deployment device 240. The medicament flows through inlet port 241, to catheter 210, releasing the medicament at the appropriate location in the vasculature of the subject.

To reposition vascular occlusion device 100, deployment release 243 is operated, lowering deployment hook 232, reassociating deployment hook 232 with proximal connector 170. Rotary actuator 242 is then operated to extend catheter 210 compressing vascular occlusion device 100 to the compressed state within catheter 210. Vascular occlusion device 100 is then repositioned and redeployed as described above.

OTHER EMBODIMENTS

Various modifications and variations of the described invention will be apparent to those skilled in the art without departing from the scope and spirit of the invention. Although the invention has been described in connection with specific embodiments, it should be understood that the invention as claimed should not be unduly limited to such specific embodiments. Indeed, various modifications of the described modes for carrying out the invention that are obvious to those skilled in the art are intended to be within the scope of the invention.

Other embodiments are in the claims.

The invention claimed is:

1. A vascular occlusion device comprising a proximal end and a distal end defining a first axis and having a length therebetween, wherein:
   a) the vascular occlusion device comprises a helical lattice along the first axis, wherein the helical lattice comprises a width that extends along a second axis that is perpendicular to the first axis, a first outer edge and a second outer edge, and one or more connectors at the proximal end, wherein the one or more connectors at the proximal end comprise one or more loops or fasteners configured for reversible separation of the vascular occlusion device from a pusher in a blood vessel of a subject;
   b) the helical lattice is a helical sheet comprising a double helix wherein a network of lattice cells extends between the first outer edge and the second outer edge of the double helix, wherein the double helix is symmetrical about a central axis of rotation; and
   c) the helical lattice is configured to convert between a compressed state and an uncompressed state about the second axis; and
   wherein, upon separation of the vascular occlusion device from the pusher in the blood vessel of the subject, the vascular occlusion device is configured to reduce blood flow in the blood vessel to less than about 4 mL/s.

2. The vascular occlusion device of claim 1, wherein the helical lattice comprises about 1 to about 25 turns.

3. The vascular occlusion device of claim 2, wherein each of the turns comprises a pitch from about 1 mm to about 30 mm.

4. The vascular occlusion device of claim 1, wherein the lattice cells are compressible cells comprising a polygonal, square, rectangular, triangular, diamond, circular, elliptical, oval, oblong, lens, asteroid, deltoid, slit, or amorphous shape.

5. The vascular occlusion device of claim 1, wherein a width of the vascular occlusion device is periodic along the length, and the width of the helical lattice is greater than the width of the vascular occlusion device at the proximal end, the distal end, or both, further wherein a maximum width of the vascular occlusion device is from about 1 mm to about 30 mm when the vascular occlusion device is in the uncompressed state.

6. The vascular occlusion device of claim 1, wherein the length of the vascular occlusion device is from about 10 mm to about 600 mm.

7. The vascular occlusion device of claim 1, wherein the helical lattice is flexible and self-expanding from the compressed state to the uncompressed state.

8. The vascular occlusion device of claim 1, wherein the one or more connectors comprises a lumen configured to accommodate a guidewire comprising a diameter from about 0.2 mm to about 1 mm.

9. The vascular occlusion device of claim 1, further comprising a radiopaque marker located on the distal end, the proximal end, the helical lattice, or combinations thereof.

10. The vascular occlusion device of claim 1, further comprising a coating, wherein the coating comprises a thrombogenic agent or a hydrogel.

11. The vascular occlusion device of claim 10, wherein the thrombogenic agent is thrombin, and the hydrogel comprises a polysaccharide, a mucopolysaccharide, a carboxy alkyl cellulose, a synthetic polymer, or a protein.

12. The vascular occlusion device of claim 1, further comprising a plurality of filaments attached to the helical lattice, wherein at least a portion of the filaments extend radially from the helical lattice.

13. A delivery system comprising:
(a) the vascular occlusion device of claim 1;
(b) a catheter comprising a proximal end and a distal end with a length therebetween;
(c) the pusher comprising a deployment shaft comprising a proximal end and a distal end, and a deployment structure at the distal end of the deployment shaft, wherein the deployment structure is configured to reversibly attach to the one or more connectors at the proximal end of the vascular occlusion device; and
(d) a cartridge comprising a proximal opening and a distal opening and a lumen sized to house the vascular occlusion device, wherein the lumen spans the length of the cartridge from the proximal opening to the distal opening.

14. The delivery system of claim 13, wherein the reversible attachment between the pusher and the one or more connectors at the proximal end of the vascular occlusion device is rotational engagement.

15. The delivery system of claim 13, wherein the proximal end of the catheter is configured to reversibly attach to a distal end of the cartridge, thereby establishing fluid communication between the catheter and the cartridge.

16. The delivery system of claim 15, wherein the cartridge comprises the vascular occlusion device inside the lumen thereof, and wherein the vascular occlusion device is configured to be slidably translated from the cartridge to the catheter upon attachment of the cartridge to the catheter.

17. The delivery system of claim 13, further comprising a guidewire, wherein the guidewire is configured to direct the vascular occlusion device through the catheter and to a target site in a blood vessel for vascular occlusion.

18. The delivery system of claim 13, further comprising a deployment device, wherein the deployment device is configured to interface with the proximal end of the catheter and the proximal end of the pusher, wherein the deployment device comprises:
(a) an actuator configured such that operation of the actuator either retracts the catheter into the deployment device, or extends the catheter from a body of the deployment device;
(b) an inlet port in fluid communication with proximal end of the catheter; and
(c) a deployment release configured such that operation of the deployment release manipulates the position of the deployment structure.

19. The delivery system of claim 18, wherein the actuator is a rotary actuator.

20. The delivery system of claim 13, wherein the deployment structure is a deployment hook.

21. A method of occluding a blood vessel, comprising:
a) inserting the vascular occlusion device of claim 1 in the compressed state into the blood vessel;
b) deploying the vascular occlusion device at a target site in the blood vessel using a pusher, whereby the vascular occlusion device converts to the uncompressed state;
c) separating the vascular occlusion device from the pusher, wherein the vascular occlusion device reduces blood flow in the blood vessel to less than 4 mL/s.

22. The method of claim 21, further comprising advancing the vascular occlusion device through the blood vessel after the inserting step a).

23. The method of claim 21, further comprising providing a cartridge comprising a proximal end, a distal end, and a lumen spanning the length therebetween, wherein the vascular occlusion device is loaded within the lumen prior to step a).

24. The method of claim 21, wherein, prior to step a), the method comprises inserting a catheter into the blood vessel and wherein inserting the vascular occlusion device into the blood vessel comprises inserting the vascular occlusion device into the catheter and advancing the vascular occlusion device along the length of the catheter.

25. The method of claim 24, further comprising attaching a distal opening of a cartridge to a proximal end of the catheter and transferring the vascular occlusion device from the cartridge into the catheter by use of a pusher comprising a deployment shaft and a deployment structure, and advancing the vascular occlusion device along the length of the catheter by use of the pusher.

26. The method of claim 25, further comprising deploying the vascular occlusion device by holding the vascular occlusion device in place by applying a non-moving biasing force against the vascular occlusion device with the pusher and pulling the catheter towards the pusher, wherein the vascular occlusion device is pushed out of the catheter at the target site, whereby the vascular occlusion device converts to the uncompressed state, thereby occluding blood flow in the blood vessel to less than about 4 mL/s.

27. The method of claim 25, further comprising reengaging the deployment structure and a proximal connector after the vascular occlusion device converts to the uncompressed state and extending the catheter along the length of the vascular occlusion device, at least partially converting the vascular occlusion device to the compressed state, and redeploying the vascular occlusion device to a different position in the vasculature of the subject.

28. The method of claim 24, wherein the method further comprises administering a therapeutic or diagnostic agent via the catheter, wherein the therapeutic agent is a thrombogenic agent or an anti-tumor agent.

29. The method of claim 21, wherein the blood vessel is a vein, an artery, a stent, an arteriole, a capillary, a splenic artery, a gastroduodenal artery, a fistula, or a graft.

* * * * *